US006261447B1

(12) United States Patent
Van Herle et al.

(10) Patent No.: US 6,261,447 B1
(45) Date of Patent: Jul. 17, 2001

(54) PORTABLE, AUTOMATIC, STEAM PRESSURIZED WATER FILTRATION SYSTEM

(76) Inventors: Philippe J. Van Herle, 10706 Lindbrook Dr., Los Angeles, CA (US) 90024; Geoffrey S. Howard, 170 E. Walnut St. 311, Pasadena, CA (US) 91103; Stewart Prince, 8342 Nestle Ave., Northridge, CA (US) 91325; Gregory Dato, 18350 Hatteras #215, Tarzana, CA (US) 91356

(*) Notice: Subject to any disclaimer, the term of this patent is extended or adjusted under 35 U.S.C. 154(b) by 0 days.

(21) Appl. No.: 09/415,768

(22) Filed: Oct. 8, 1999

(51) Int. Cl.[7] .................................................. B01D 35/00
(52) U.S. Cl. ........................ 210/175; 210/180; 210/186; 210/257.1; 210/416.3; 210/473; 99/300; 219/440
(58) Field of Search ............................... 210/97, 109, 110, 210/120, 175, 180, 184, 186, 241, 257.2, 416.1, 416.3, 472, 473; 417/207–209, 437, 572; 99/292, 293, 300, 463, 410; 126/369, 369.1; 219/440; 222/573.1, 573.4; 26/257.1, 258

(56) References Cited

U.S. PATENT DOCUMENTS

| 396,234 | * | 11/1889 | Roake | 210/186 |
|---|---|---|---|---|
| 417,372 | * | 12/1889 | Tellier | 210/184 |
| 4,582,047 | * | 4/1986 | Williams | 126/369 |
| 4,604,948 | * | 8/1986 | Goldhahn . | |
| 4,957,624 | * | 9/1990 | Peranio | 210/184 |

* cited by examiner

Primary Examiner—Joseph W. Drodge

(57) ABSTRACT

A water filtration system which utilizes steam pressure to provide energy for the pumping process, has a boiler (1) which shall be used to develop steam (19) and shall be heated by a stove (27). The steam produced shall flow through a steam tube (7) and into a water bottle (9) which contains contaminated water (21) to be filtered and wherein floating insulation (17) exists to thermally isolate the steam from the water. The steam pressure in the water bottle shall force the water out through a water tube (25) and then through a water filter (23) at which point potable water will be available to the user.

40 Claims, 36 Drawing Sheets

PORTABLE, AUTOMATIC, STEAM PRESSURIZED WATER FILTRATION SYSTEM

BACKGROUND

1. Field of Invention

This invention relates water filtration systems, specifically those which utilize steam power to pump the water which is to be filtered.

2. Description of Prior Art

In recent years the outdoor products market has seen several new water filtration systems come to market in order to provide outdoor enthusiasts with a portable means to filter water from potentially contaminated water sources. Most of those systems are composed of a small, hand operated piston pump which is used to pump contaminated water through a filter element. Most filter elements are composed of highly restrictive materials which physically filter microorganisms and viruses which cannot fit through the small pores in the filter media. Restrictive filter elements are the main reason that water filtering is a very physically strenuous process.

Most of the manufacturers entering this market have created products that were intended to meet the following goals:

i) A filtering system which is lightweight and portable.
ii) A filtering system which minimizes the human effort required to pump water through the filter.
iii) A system which can filter large volumes of water in a short amount of time.
iv) A system which can filter out microorganisms, bacteria, viruses and miscellaneous chemicals.
v) A system which is low cost.

None of the products currently offered on the market can meet all of these goals. This situation is what inspired the inventors to create the water filtering device described in this patent.

Companies such as Pur, General-Ecology, MSR, Sweetwater, Katadyn and Stearns all offer the classic piston pump water filtering system on the market. Those products generally meet three of the five previously stated goals. The goals that are met are that they are lightweight and portable, most can filter microorganisms, bacteria, viruses and chemicals and most are relatively low cost. The goal of filtering large volumes of water in a short amount of time is highly user dependent. Most of these systems are rated to flow anywhere from 1–1.5 liters/minute but these numbers are dependent on the strength and physical condition of the user. Manually pumping water with these systems is very strenuous and should a user be required to filter a large amount of water, flow rates will drop as muscle fatigue sets in. By their nature these systems cannot meet the goal of reducing the human effort to filter the water as human effort is required to power the pumping system of these devices.

Due to the amount of human effort required of the aforementioned water filtration systems, manufacturers have set out to find solutions to this problem. One device that came from this effort is what is known as a squeeze bottle filter. SafeWater Anywhere is one of the more popular manufacturers of such a device. This device is basically composed of a plastic water bottle having a filter element mounted in its top. To filter water the user simply fills the bottle with water and then either squeezes or sucks water through the filter element. This device generally meets three of the five desired goals. It is lightweight and portable, it minimizes human effort and it is a low cost system. The goal of minimizing human effort only seems to partially met however. This device still requires human effort in the form of squeezing or sucking. It would be very tedious for the user to use this device for filtering large amounts of water for general camping uses such as cooking and making mixed drinks. It does not meet the goal of being able to pump large amounts of water in a short amount of time as it is generally designed for personal water sipping use. It also fails to filter viruses, small bacteria and many chemicals as it uses a less restrictive filter thereby enabling water to be squeezed or sucked from it.

Clearwater is another manufacturer that has made a partially successful attempt to meet all five of the above stated goals. They have created a simple gravity pressurized pumping system which can pump water through a filter element. This system is comprised of a water storage bag and a filter element. With this system the user would fill the storage bag with water and hang it from a tree. The user would then connect a tube from the bag to the filter, thereby allowing gravity to force the stored water through the filter. This system generally meets four of the five desired goals. It is lightweight and portable, it requires no human effort to pump the water through the filter, it can filter microorganisms, bacteria, viruses and chemicals and it is a low cost system. Although no human effort is required to pump the water, it can be rather tedious to hang the water container bag up in a tree. This system does not meet the goal of pumping large volumes of water in a short amount of time as gravity only provides enough work to cause a trickle of water to flow out of the filter element.

One can determine from the previous discussion that up until the invention of the device for which this patent is written, there has been no water filtration system which has met all five of the above stated goals. A thorough patent search has also revealed that there is no system which even remotely resembles the device being patented herein. For these reasons the inventors of this invention do state that to the best of their knowledge that no other water filtering system exists that is similar to or has the same attributes as the water filtration system being patented herein.

OBJECTS AND ADVANTAGES

The objects and advantages of the invention disclosed in this application are:

a) A filtering system that is lightweight and portable
b) A filtering system that requires no human effort to pump water through the filter
c) A system that can filter large volumes of water in a short amount of time
d) A system that can filter out microorganisms, bacteria, viruses and miscellaneous chemicals
e) A system that is low cost
f) A system that inherently has the capability to have one of its components used as a pressure cooker
g) A system that inherently has the capability to have one of its components to be used as an air tight food storage container Further objects and advantages will become apparent from the ensuing drawings and description.

REFERENCE NUMERALS IN THE FIGURER

1. Boiler
3. Pressure Pop Off Safety Cap
5. Boiler Outlet Tube
7. Steam Tube
9. Water Bottle
11. Water Bottle Cap
13. Steam Inlet Tube
15. Water Outlet Tube
17. Floating Insulation
19. Steam
21. Water
23. Water Filter
25. Water Tube
27. Stove
29. Pressure Relief Safety Valve
31. Pressure Relief/Boiler Water Filling Valve
33. Water Container Filling Valve
35. Water Container Filling Tube
37. Auxiliary Water Storage Container
39. Auxiliary Water Storage Container Cap 41. Pressure Cooker Pot
43. Pressure Cooker Top
45. Pressure Cooker Pot/Top Sealing Device
47. Water Container
49. Water Container Top
51. Water Container Steam Inlet Valve
53. Water Container Water Outlet Valve
55. Collapsible Water Container
57. Collapsible Water Container Top
59. Collapsible Water Container Stand
61. Insulated Steam Pressure Bladder
63. Insulated Water Container Bladder
65. Collapsible Water Container Frame
67. Hinge
69. Steam Inlet Cap w/Tube Fitting
71. Water Outlet Cap w/Tube Fitting
73. Boiler Thermal Insulation Shield
75. Steam Tube Thermal Insulation
77. Steam Pressurized Water Container Thermal Insulation
79. Pressure Pop Off Safety Cap Deflector
81. Tether
83. Anchor
85. Prefilter
87. Bottle Stand Ring
89. Bottle Stand Leg
91. Vacuum Relief Valve
93. Water Level Actuated Steam Shut Off Valve
95. Steam Shut Off Valve Actuation Cable
97. Steam Shut Off Valve Actuation Float Description FIGS. 1 to 34

Figure 1:
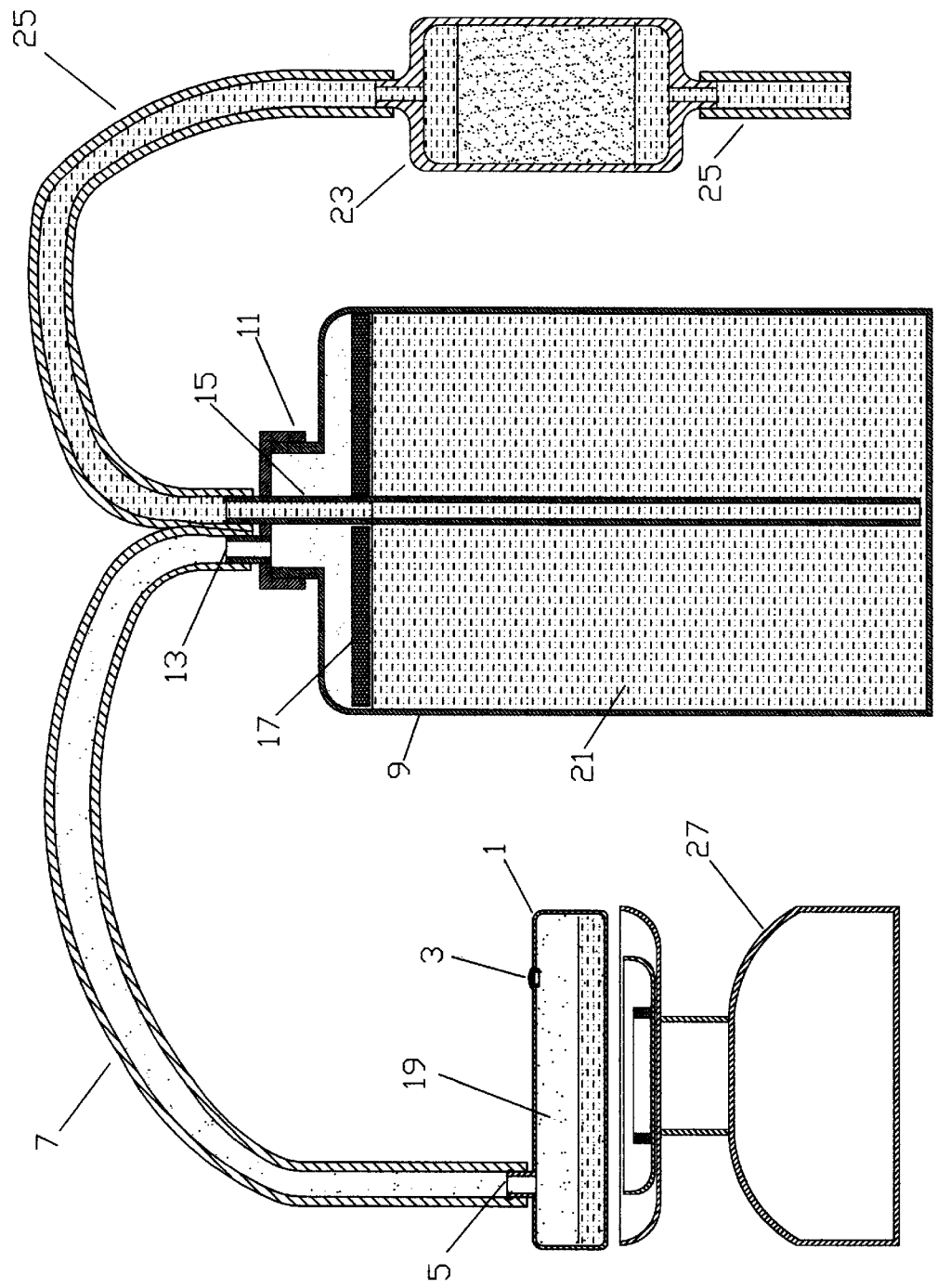
FIG. 1: This figure shows a cross section of the most basic embodiment of the steam pressurized water filtration system.

FIG. 1: This figure displays a basic embodiment of the invention wherein a stove (27) is used to boil water in the boiler (1). The steam (19) produced then runs out of the boiler outlet tube (5), through the steam tube (7) and into the water bottle (9) via the steam inlet tube (13) which is integral to the water bottle cap (11). The water bottle stores the water (21) that is to be filtered The floating insulation (17) is used to thermally isolate the steam (19) from the water thereby preventing steam condensation and the drop in steam pressure that accompanies condensation. As the steam pressure builds inside the water bottle (9), the water will begin to flow out via the water outlet tube (15), flowing through a water tube (25) and finally being pumped through the water filter (23). Filtered water will then exit the system from a water tube (25). In this embodiment there exists a pressure pop off safety cap (3) mounted to the boiler (1), which shall pop off of the boiler if steam pressure exceeds design limits thereby decreasing the boiler pressure to a safe level.

Figure 2:
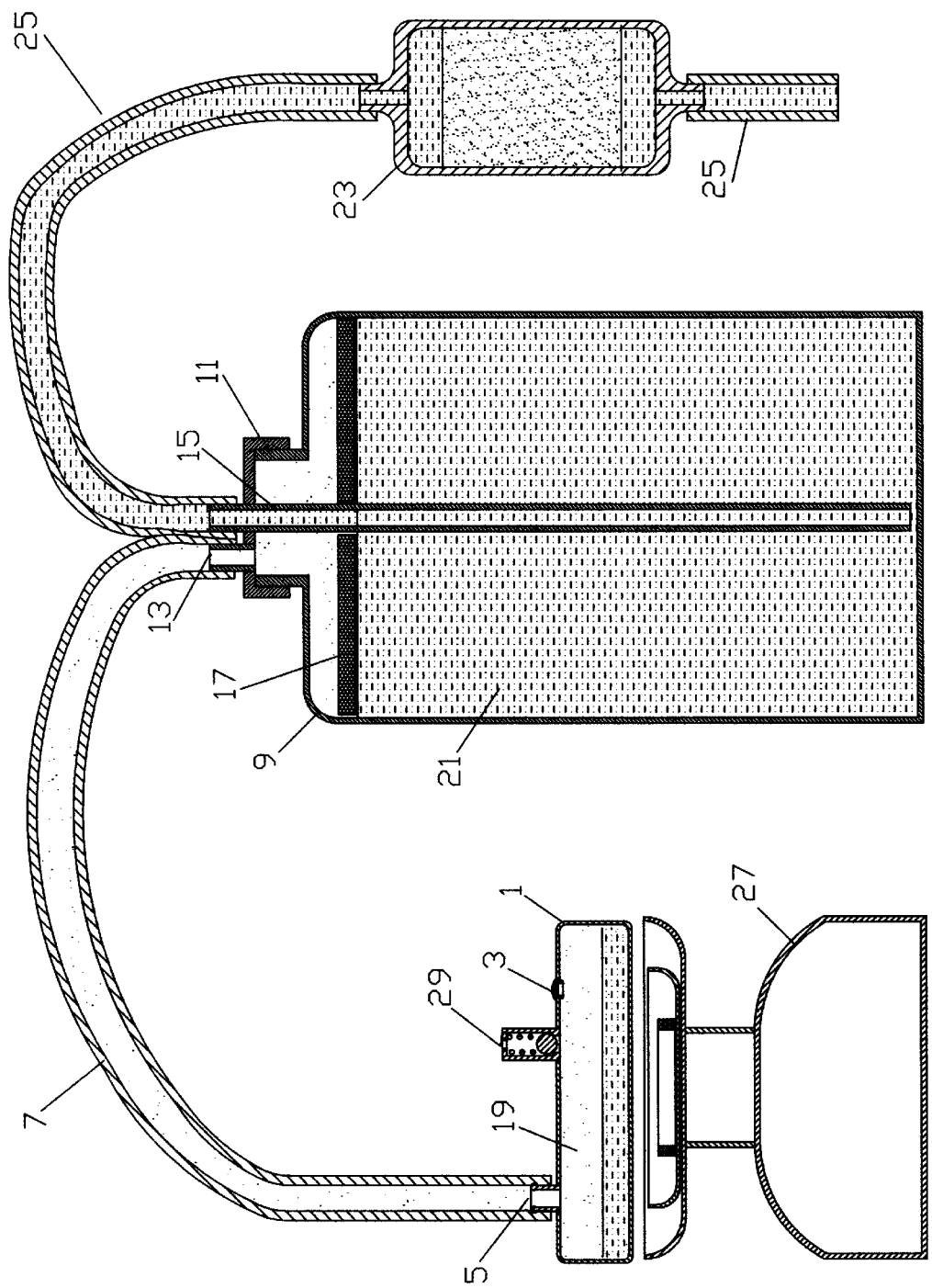
FIG. 2: This figure is similar to that of FIG. I with the only addition being a pressure relief safety valve.

FIG. 2: This figure is nearly identical to that of FIG. 1 except that a pressure relief safety valve (29) is mounted to the boiler (1). The pressure relief safety valve (29) will release steam pressure as it goes above design limits but will then reseal the boiler (1) as the pressure drops back below the design maximum pressure limits. In this embodiment the pressure pop off safety cap (3) will only pop off if the pressure relief safety valve (29) experiences either choked flow or becomes clogged as the steam pressure goes above design limits.

Figure 3:
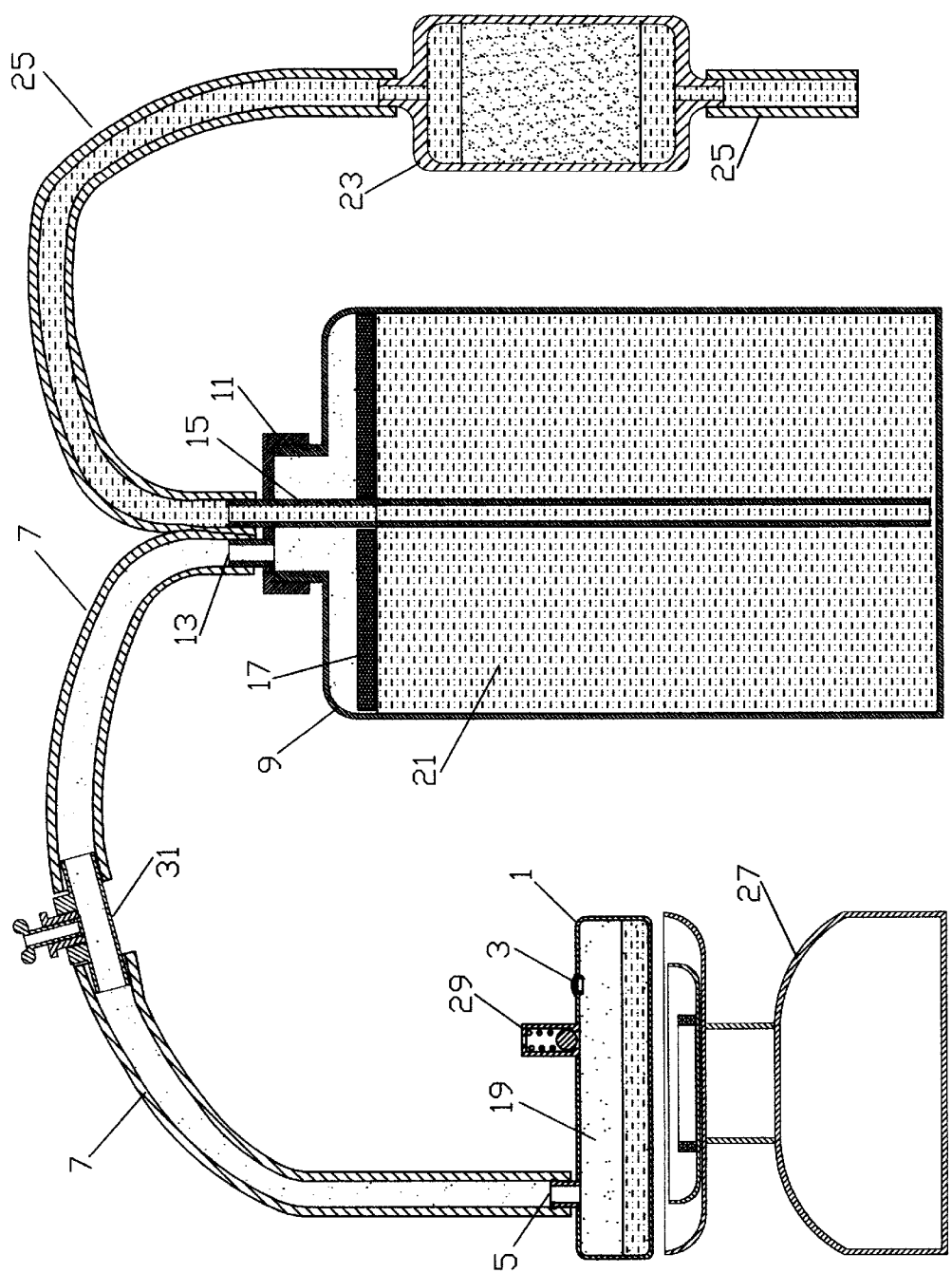
FIG. 3: This figure is similar to FIG. 2 with the only addition being a pressure relief/boiler water filling valve.

FIG. 3.: This figure is nearly identical to that of FIG. 2 except for the addition of the pressure relief/boiler water filling valve (31). This valve acts as an auxiliary pressure relief valve and also as a water filling point for the boiler (1). By using this as a boiler water filling point, the user can fill the boiler with a calibrated amount of water so as to increase the boiler (1) efficiency and reduce pumping time. The user may use either a calibrated syringe or other volume metering device to fill the boiler (1) with the optimum amount of water before each pumping cycle. This adds convenience of use to the system, as the user does not have to wait for the boiler (1) to become cool enough to handle to refill it. This also reduces overall pumping time as it enables the boiler (1) to run at its most efficient point.

Figure 4:
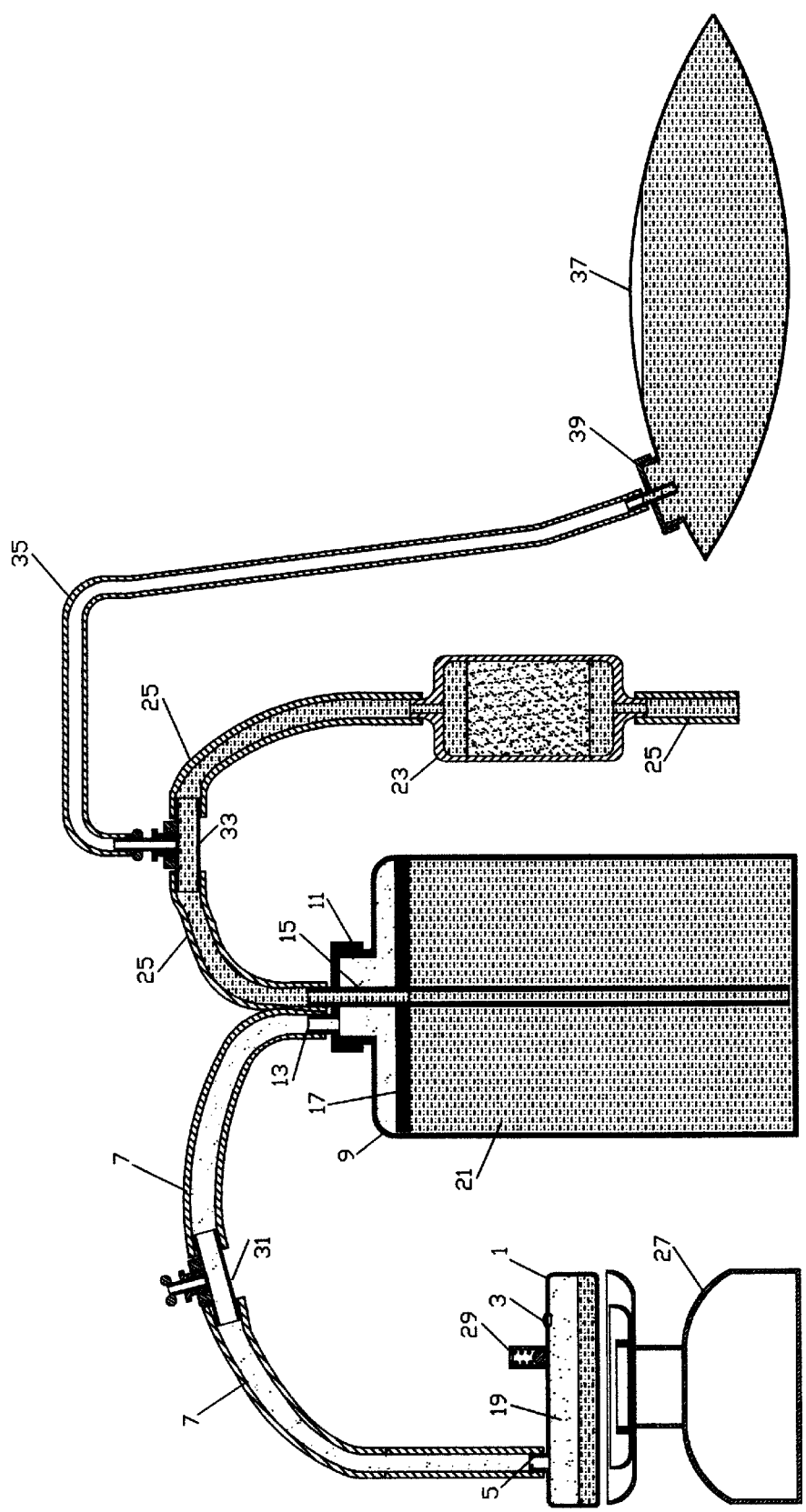
FIG. 4: This figure is similar to FIG. 3 with the additions to this figure being a water container filling valve, a water container filling tube, an auxiliary water storage container and an auxiliary water storage container cap.

FIG. 4: This figure shows an embodiment almost identical to that of FIG. 3. In this embodiment a water container filling valve (33) was added in order to allow the user to refill the water bottle (9), or any other pressurizable water container, between pumping cycles. In order to make this system even more convenient an auxiliary water storage container (37) can be connected to the water container filling valve (33) via the water container filling tube (35) which is connected to the auxiliary water container storage cap (39).

Figure 5:
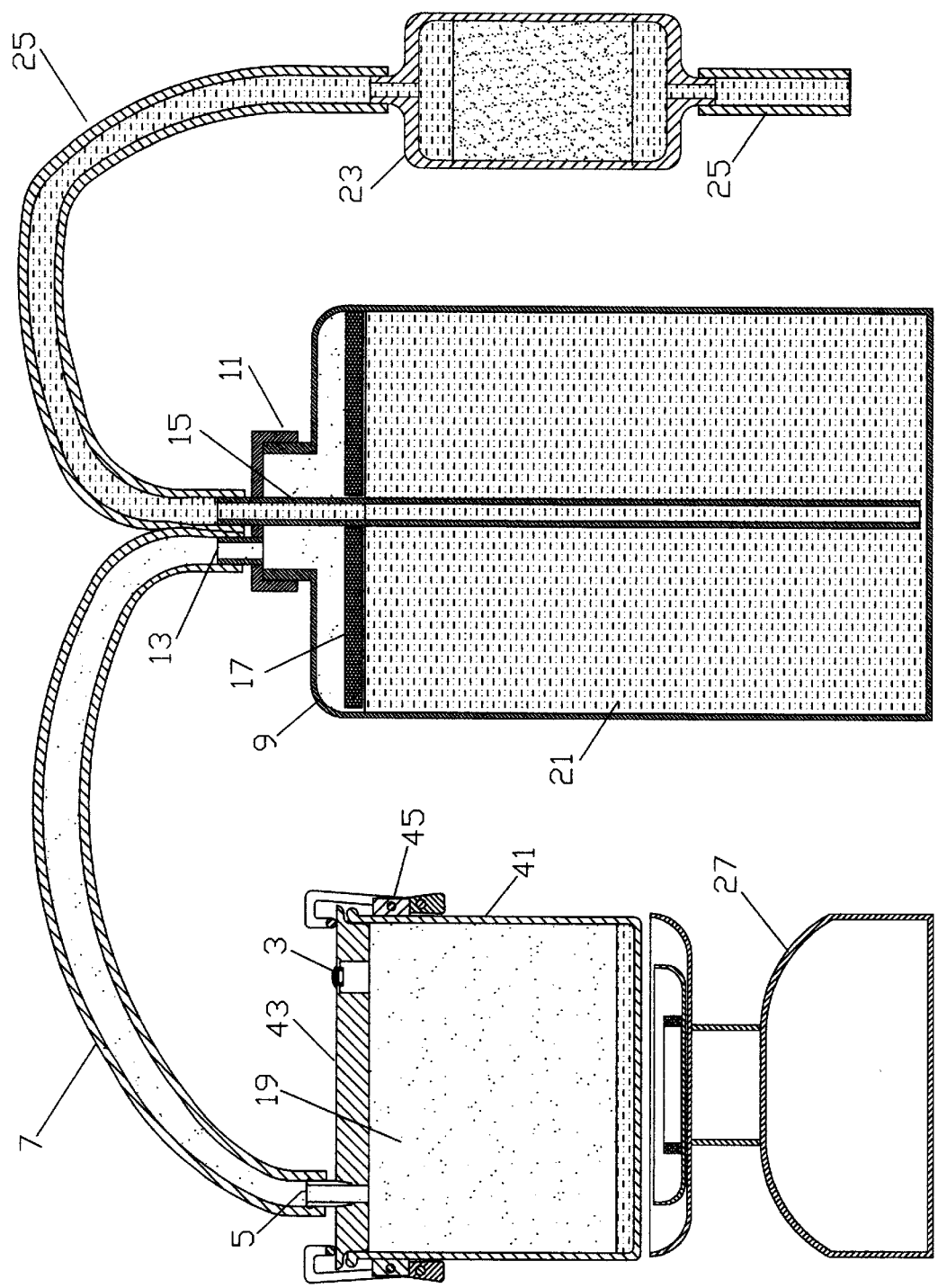
FIG. 5: The invention embodiment shown in this figure is similar to that shown in FIG. 1 the only difference in this embodiment is that the boiler has been replaced by a pressure cooker.

FIG. 5: This figure displays an embodiment similar to that displayed in FIG. 1, the main difference being that a pressure cooker has been substituted in for the boiler (1). The added parts which comprise the pressure cooker are a pressure cooker pot (41), a pressure cooker top (43) and a pressure cooker pot/top sealing device (45).

Figure 6:
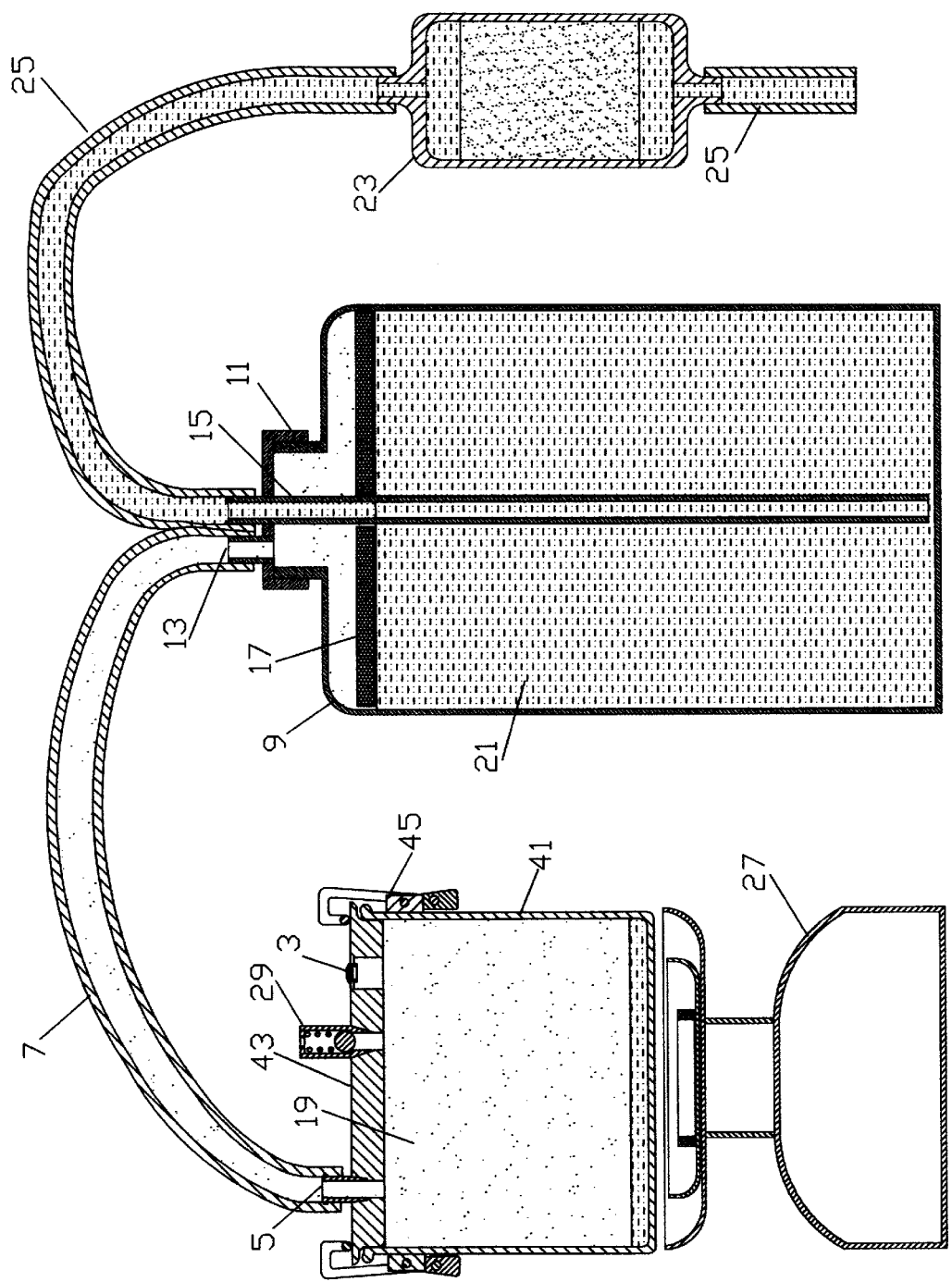
FIG. 6: This figure is similar to that of FIG. 5 with the only addition being a pressure relief safety valve.

FIG. 6: The figure displayed here is similar to that shown in FIG. 5 except for the addition of a pressure relief valve (29).

Figure 7:
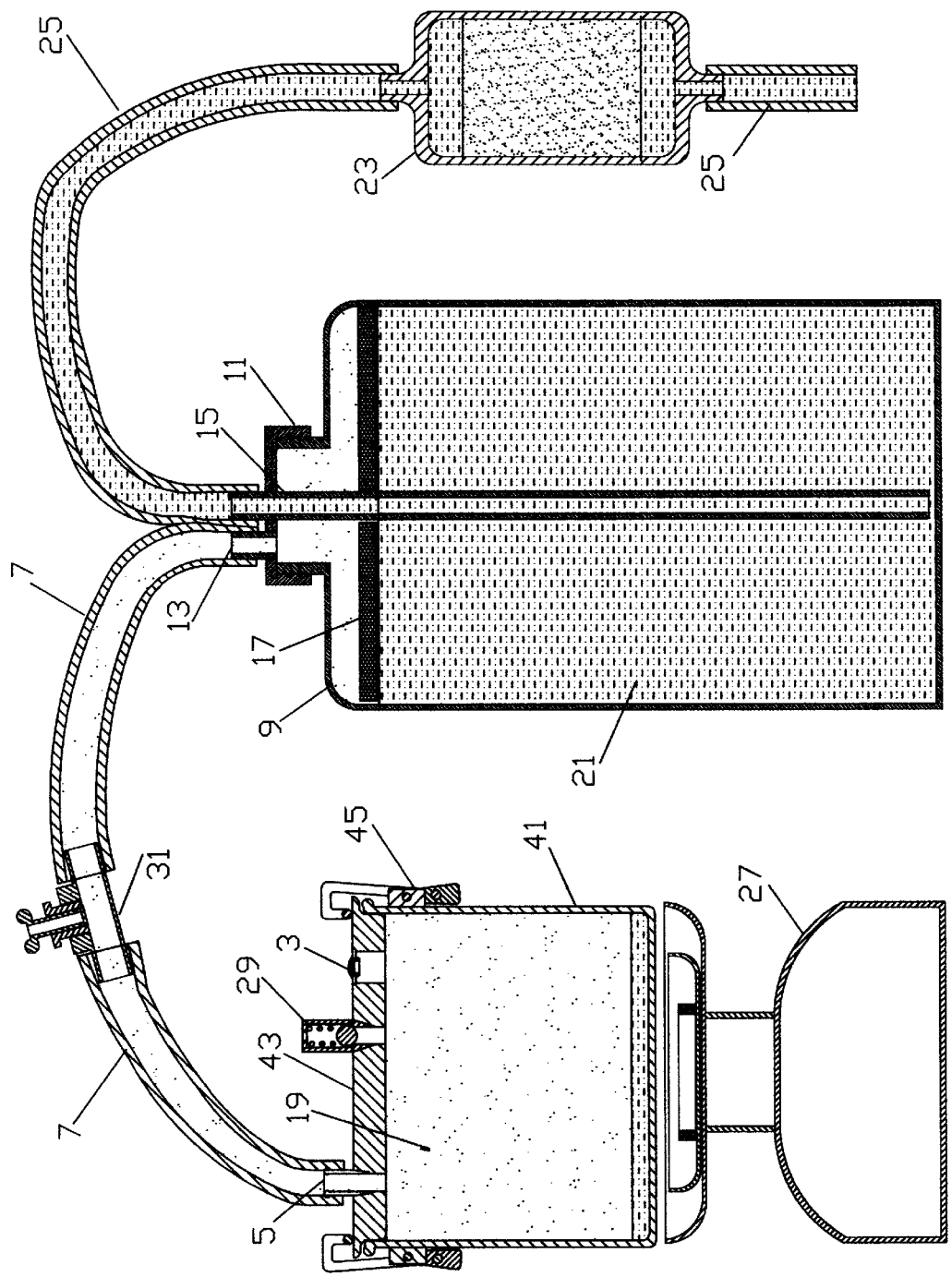
FIG. 7: This figure is similar to FIG. 6 with the only addition being a pressure relief/boiler water filling valve.

FIG. 7: The figure displayed here is similar to that shown in FIG. 6 except for the addition of the pressure relief/boiler water filling valve (31).

Figure 8:
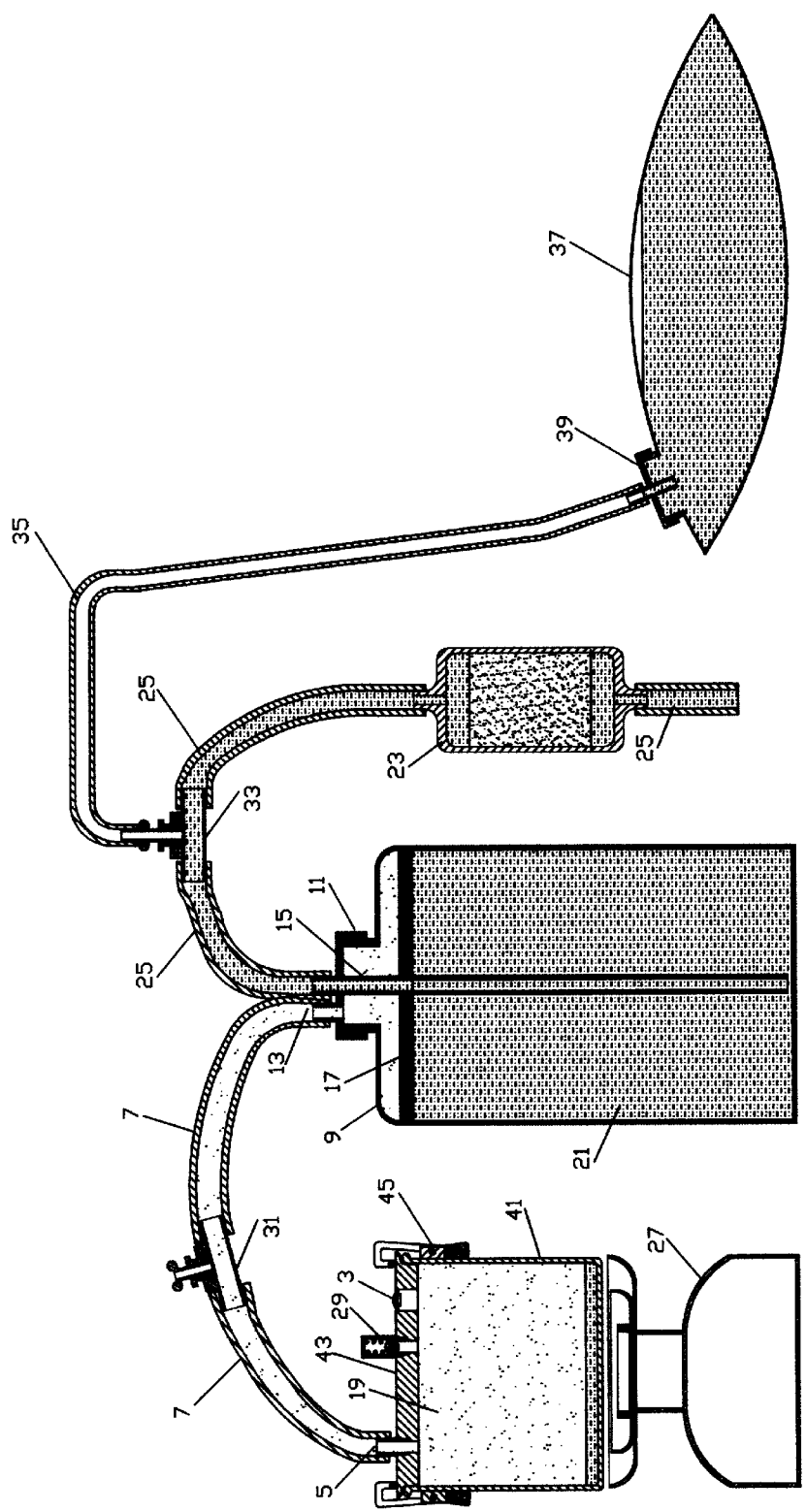
FIG. 8: This figure is similar to FIG. 7 with the additions to this figure being a water container filling valve, a water container filling tube, an auxiliary water storage container and an auxiliary water storage container cap.

FIG. 8: The figure displayed here is similar to that shown in FIG. 7 except for the addition of the water container filling valve (33), the water container filling tube (35), the auxiliary water storage container (37) and the water storage container cap (39).

Figure 9:
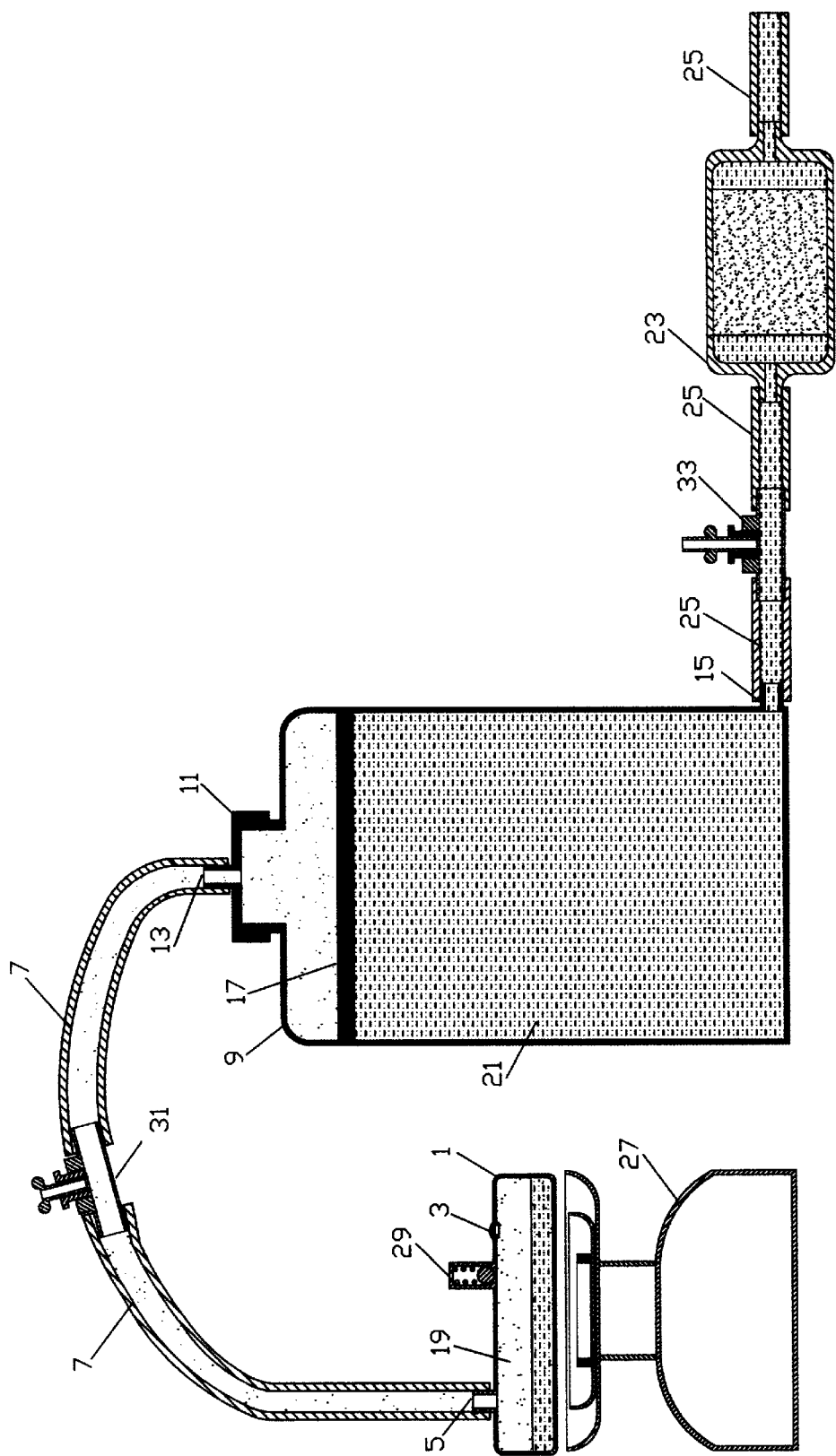
FIG. 9: This figure shows an embodiment similar to that of FIG. 4 the only difference being that the water bottle has its water outlet tube mounted near its bottom.

FIG. 9: This figure displays an embodiment similar to the one shown in FIG. 4 with the difference being that the water outlet tube (15) is located near the bottom of the water bottle (9). Note: in this figure and those following, the water container filling tube (35), auxiliary water storage container (37) and the auxiliary water storage container cap (39) are not shown in order to prevent cluttering of the figures.

Figure 10:
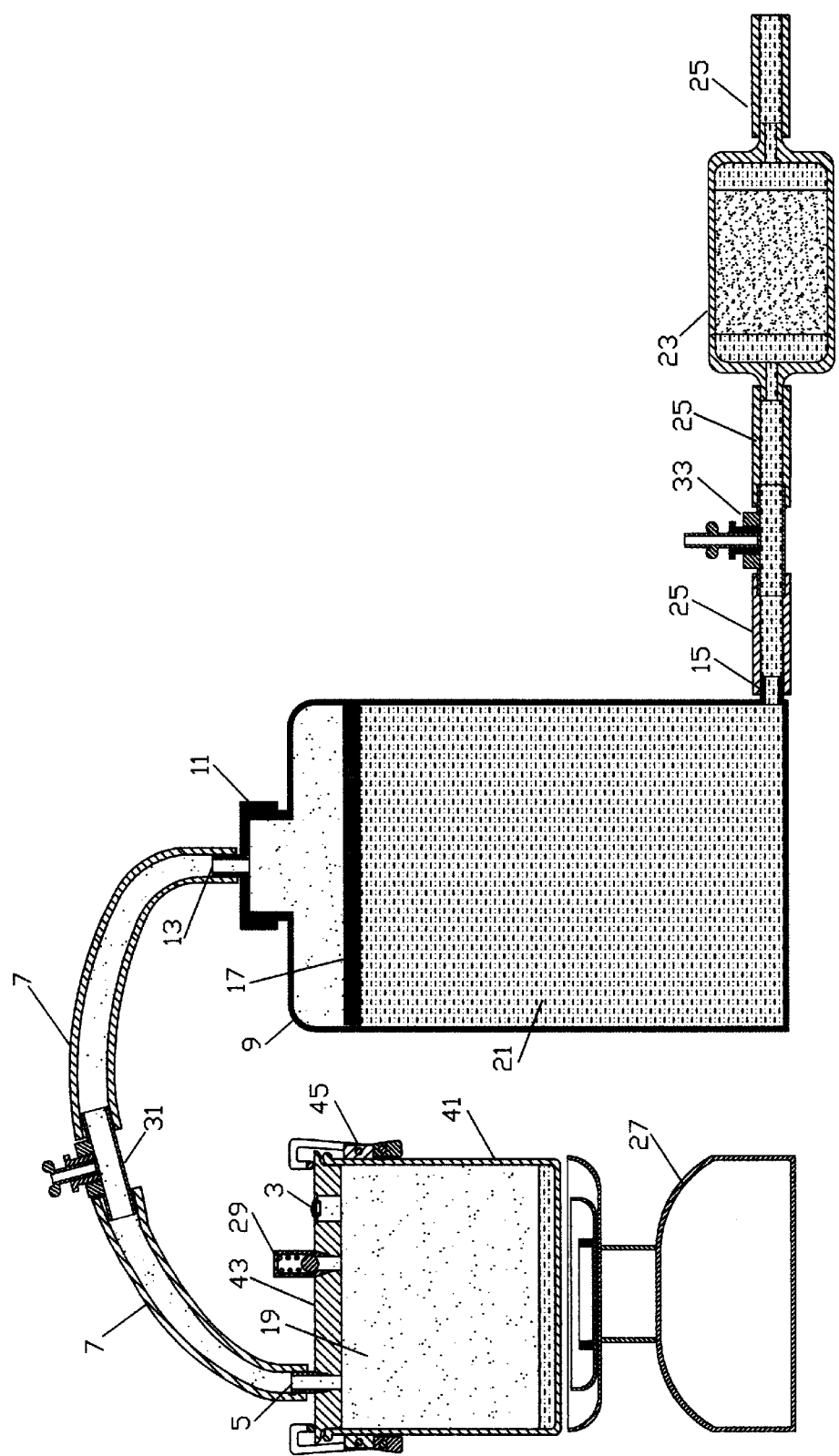
FIG. 10: This figure shows an embodiment similar to that of FIG. 8, the only difference being that the water bottle has its water outlet tube mounted near its bottom.

FIG. 10: This figure displays an embodiment similar to that of FIG. 9 with the exception that the boiler (1) has been replaced by a pressure cooker.

Figure 11:
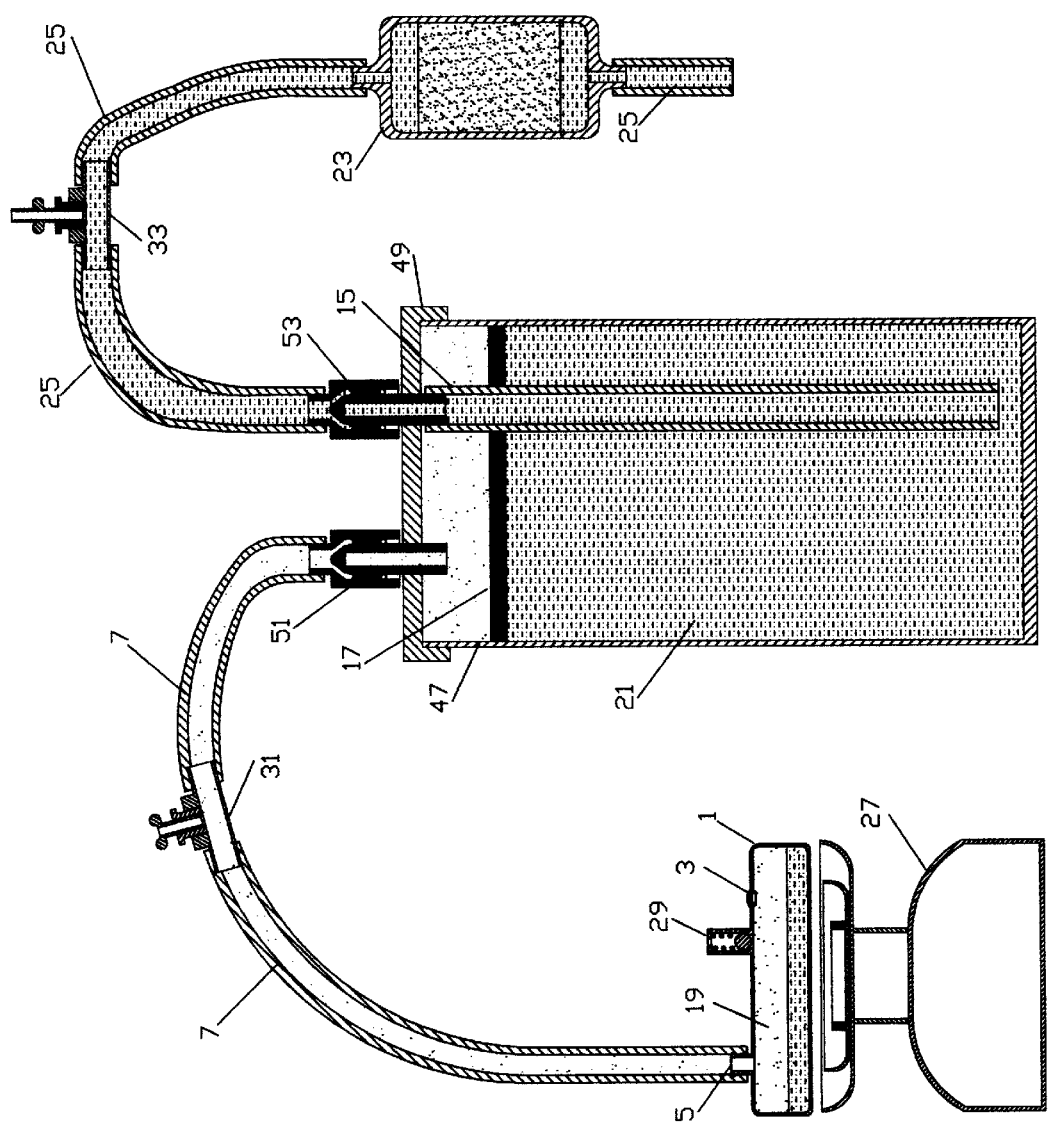
FIG. 11: This figure shows an embodiment similar to that of FIG. 4 with the only difference being that the water bottle has been replaced by a rigid water container have a removable top with two sealable valves mounted to the top.

FIG. 11: This figure displays an embodiment similar to that of FIG. 4 except that in this embodiment the water bottle (9) has been replaced with a rigid water container (47) having a large opening and internal cavity in which the system components can be stored in after use. Mounted to the water container top (49) are a water container steam inlet valve (51) and a water container water outlet valve (53).

Figure 12:
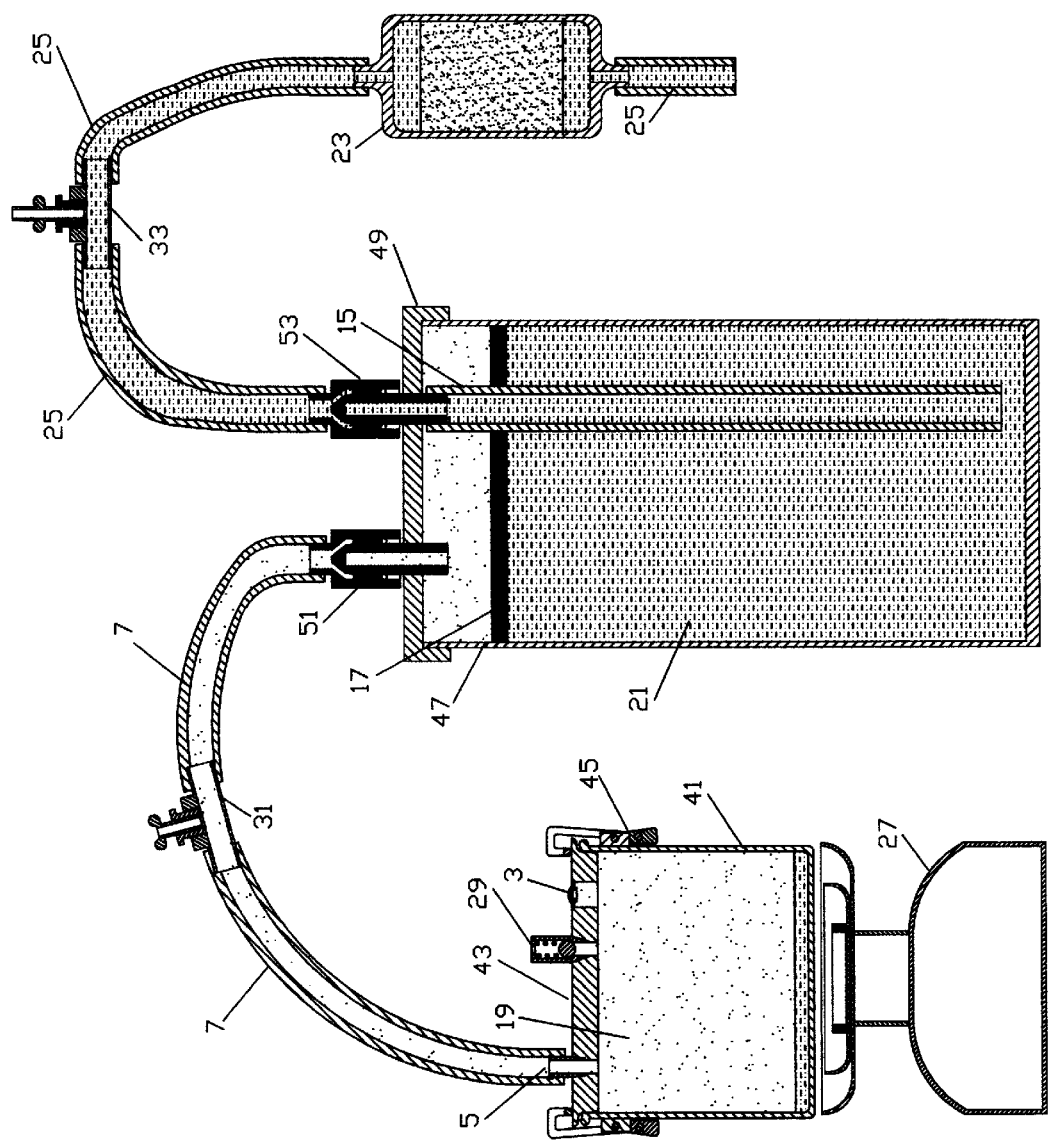
FIG. 12: This figure shows an embodiment similar to FIG. 11 the only difference being that the boiler has been replaced by a pressure cooker.

FIG. 12: This figure shows an embodiment similar to that of FIG. 11 the difference in this embodiment is that the boiler (1) is replaced by a pressure cooker FIG. 13.: This figure displays how the water container (47) displayed in the embodiments of FIG. 11 and FIG. 12, can be used to store the system components. Stored in this water container (47) are a water filter (23), a pressure cooker assembly and a stove (27). Note that, although not displayed, all the system tubing and the auxiliary water storage container (37) may also be stored. Because the water container steam inlet valve (51) and the water container water outlet valve (53) can be sealed shut, the enclosure can be made airtight thereby rendering it useful to store food so animals will not be able to smell the food inside.

Figure 14:
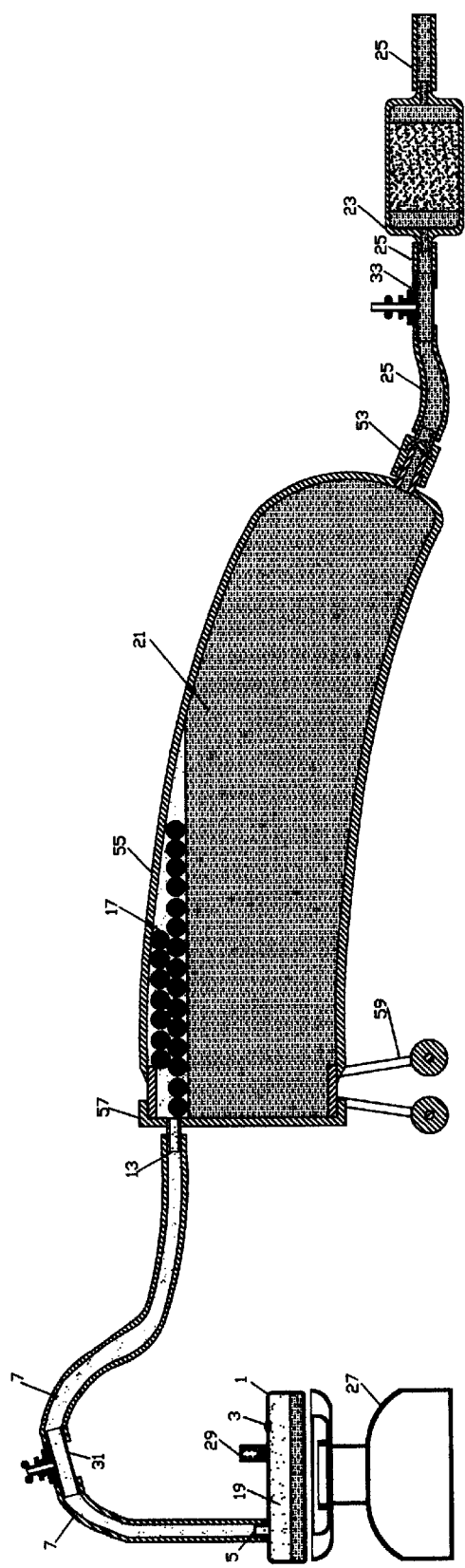
FIG. 14: This figure shows an embodiment similar to that of FIG. 4 the only difference being that the water bottle has been replaced by a collapsible water container.

FIG. 14: This figure displays an embodiment wherein a collapsible water container (55) is used to contain the water (21) to be filtered. In this embodiment there exists a collapsible water container top (57) which can be removed for water filling and also connects to the steam tube (7). A water container water outlet valve (53) is mounted to the collapsible water container (55) so as to allow water (21) to be pumped out. Insulation (17) will float on top of the water (21) and will be in a form such that it will constantly cover the water surface even as the water level drops. A collapsible water container stand (59) is mounted to the collapsible water container (55) so as to hold it up.

Figure 15:
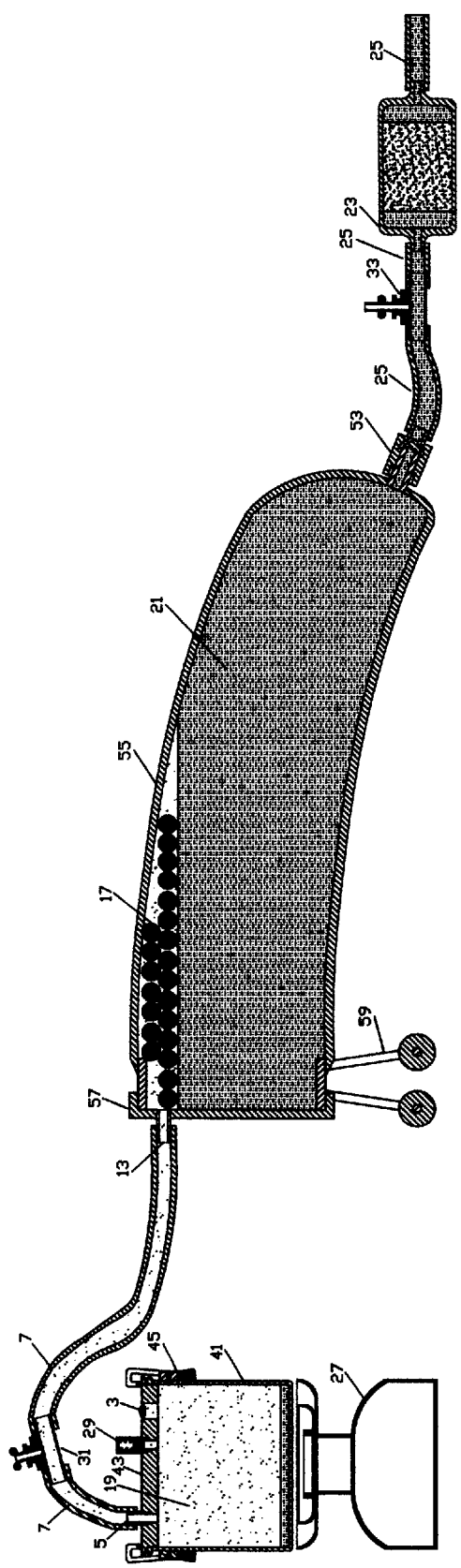
FIG. 15: This figure shows an embodiment similar to that of FIG. 8 the only difference being that the water bottle has been replaced by a collapsible water container.

FIG. 15: This figure displays an embodiment similar to that of FIG. 14, the only difference being that a pressure cooker assembly has replaced the boiler (1).

Figure 16:
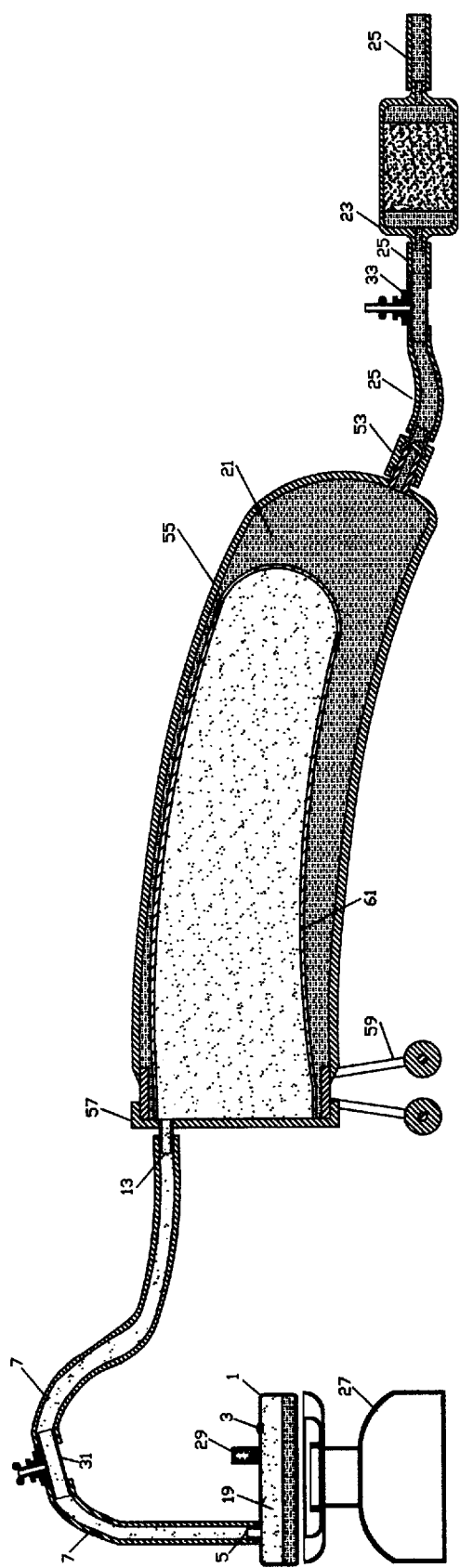
FIG. 16: This figure shows an embodiment similar to that of FIG. 14 the only difference being that the floating insulation has been replaced by an insulated steam pressure bladder.

FIG. 16: This figure displays an embodiment similar to the one displayed in FIG. 14 the difference being that the floating insulation (17) has been replaced by an insulated steam pressure bladder (61) which shall house the steam (19) and thermally isolate the steam (19) from the water (21) to be pumped.

Figure 17:
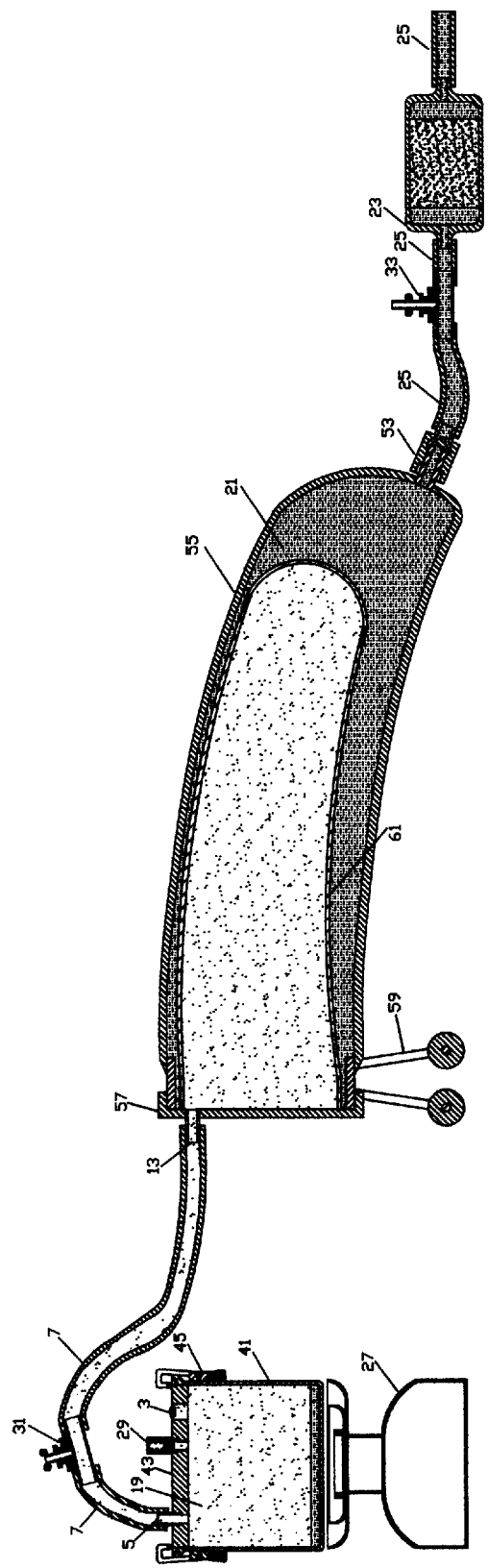
FIG. 17: This figure shows an embodiment similar to that of FIG. 15 the only difference being that the floating insulation has been replaced by an insulated steam pressure bladder.

FIG. 17: This figure displays an embodiment similar to the one shown in FIG. 16 the only difference being that the boiler (1) has been replaced by a pressure cooker assembly.

Figure 18:
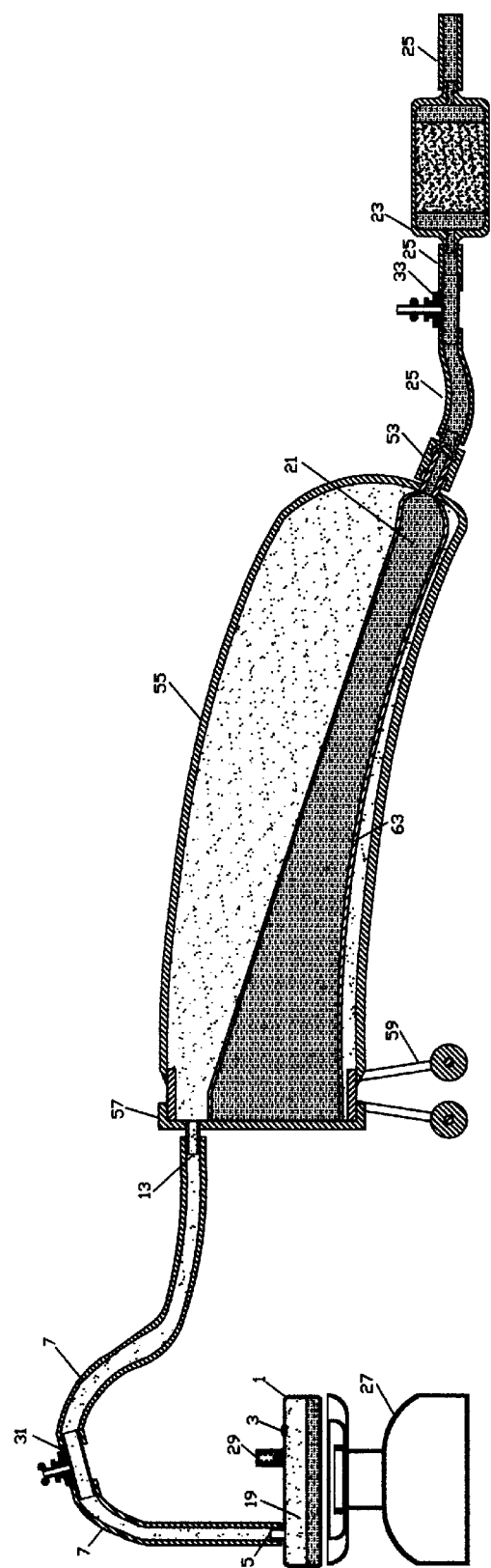
FIG. 18: This figure shows an embodiment similar to that of FIG. 16 the only difference being that the floating insulation has been replaced by an insulated water container bladder.

FIG. 18: This figure displays an embodiment similar to the one displayed in FIG. 14 the difference being that the floating insulation (17) has been replaced by an insulated water container bladder (63). The insulated water container bladder (63) shall store the water (21) to be pumped and thermally isolate it from the steam (19).

Figure 19:
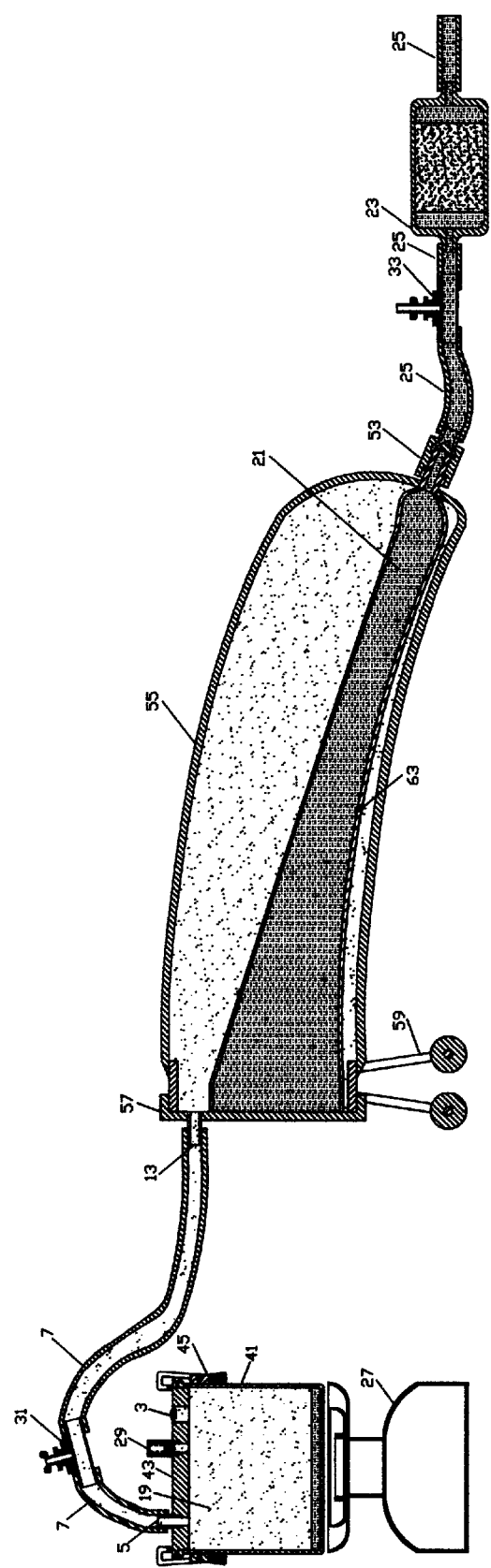
FIG. 19: This figure shows an embodiment similar to that of FIG. 17 the only difference being that the floating insulation has been replaced by an insulated water container bladder.

FIG. 19: This figure displays an embodiment similar to the one shown in FIG. 18 the only difference being that the boiler (1) has been replaced by a pressure cooker assembly.

Figure 20:
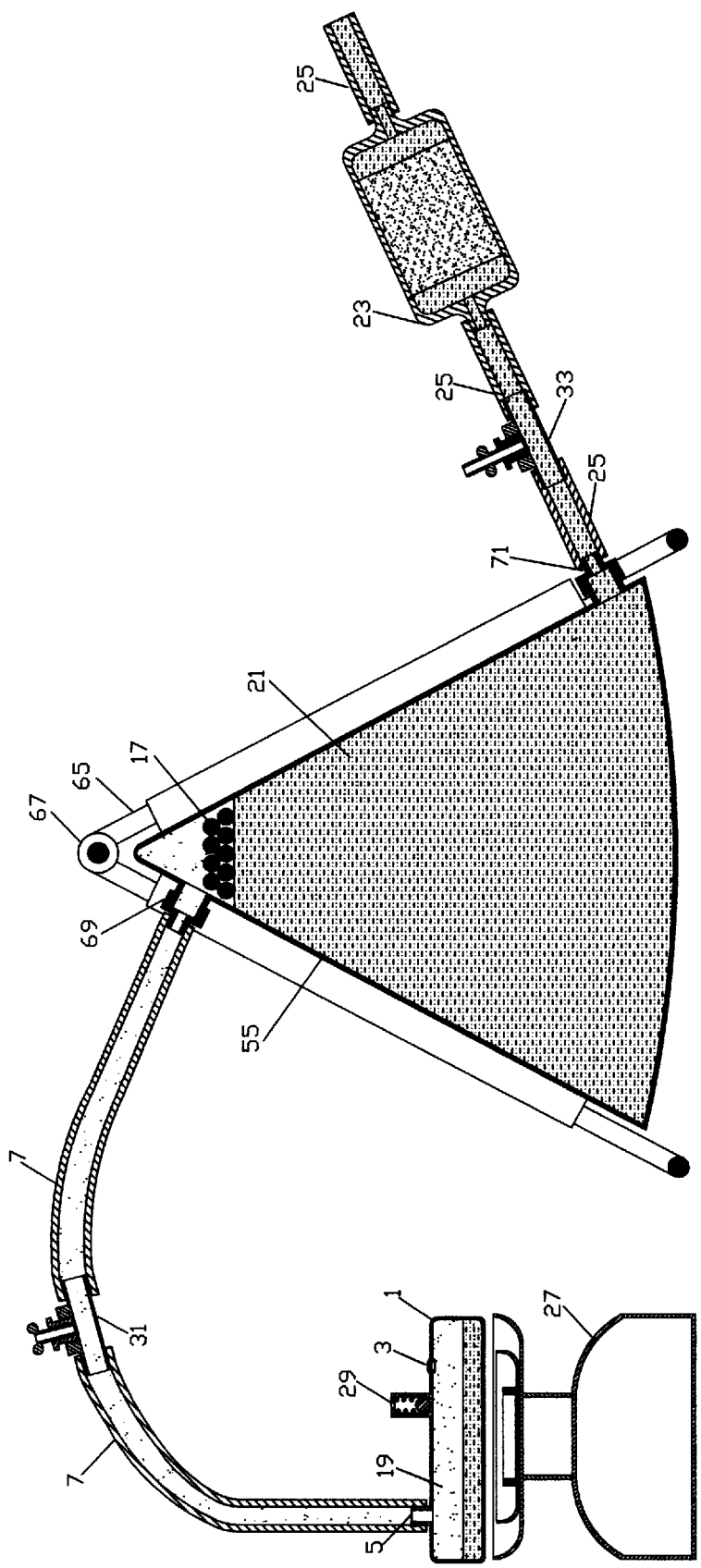
FIG. 20: This figure shows an embodiment similar to that of FIG. 14 the only difference being that the collapsible water container is attached to a foldable frame.

FIG. 20: This figure displays and embodiment wherein the water (21) is stored in a collapsible water container (55) which is fixed to a collapsible water container frame (65). A hinge (67) mounted to the collapsible water container frame (65) enables the user to easily create an empty volume within the collapsible water container (55) thereby enabling easier water filling. Attached to the collapsible water container (55) are a steam inlet cap with tube fitting (69) and a water outlet cap with tube fitting (71). The floating insulation (17) in this embodiment shall constantly cover the entire surface of the water (21), even as the water level drops.

Figure 21:
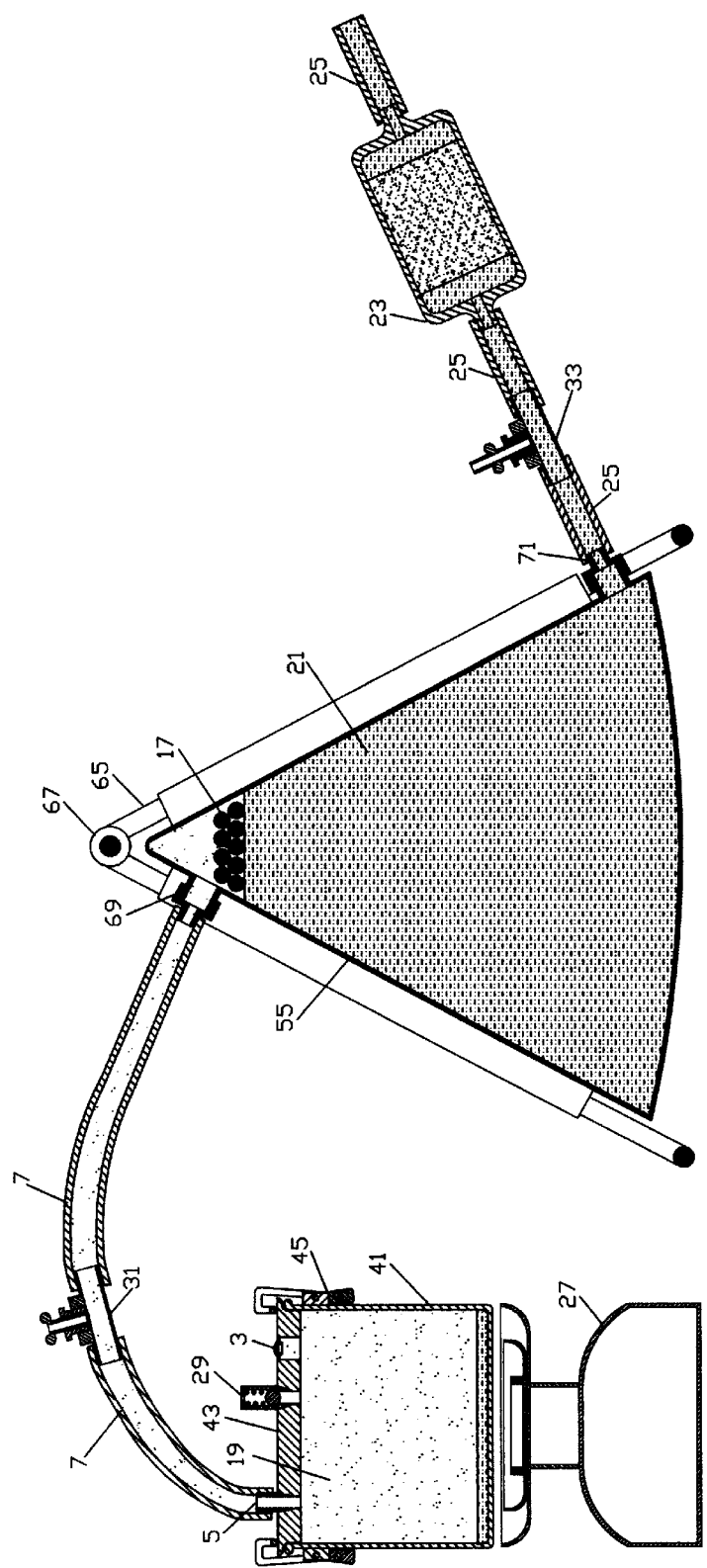
FIG. 21: This figure shows an embodiment similar to that of FIG. 15 the only difference being that the collapsible water container is attached to a foldable frame.

FIG. 21: This figure displays an embodiment similar to the one shown in FIG. 20 the only difference being that the boiler (1) has been replaced by a pressure cooker assembly.

Figure 22:
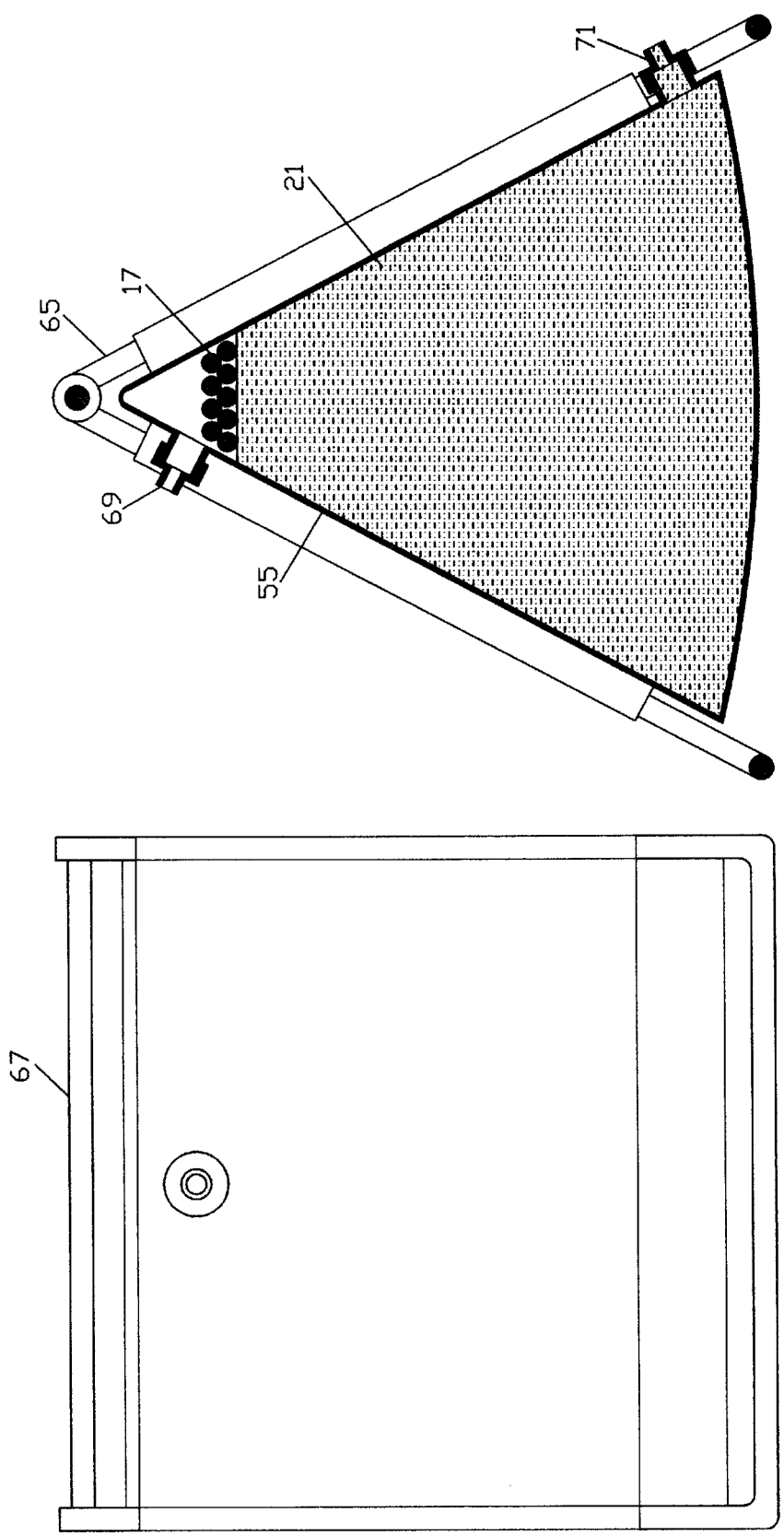
FIG. 22: This figure shows the front and cross sectional side views of the collapsible water container shown if FIGS. 20 and 21.

FIG. 22: This figure shows the front and side views of the water containing assembly of the embodiments of FIGS. 20 and 21.

Figure 23:
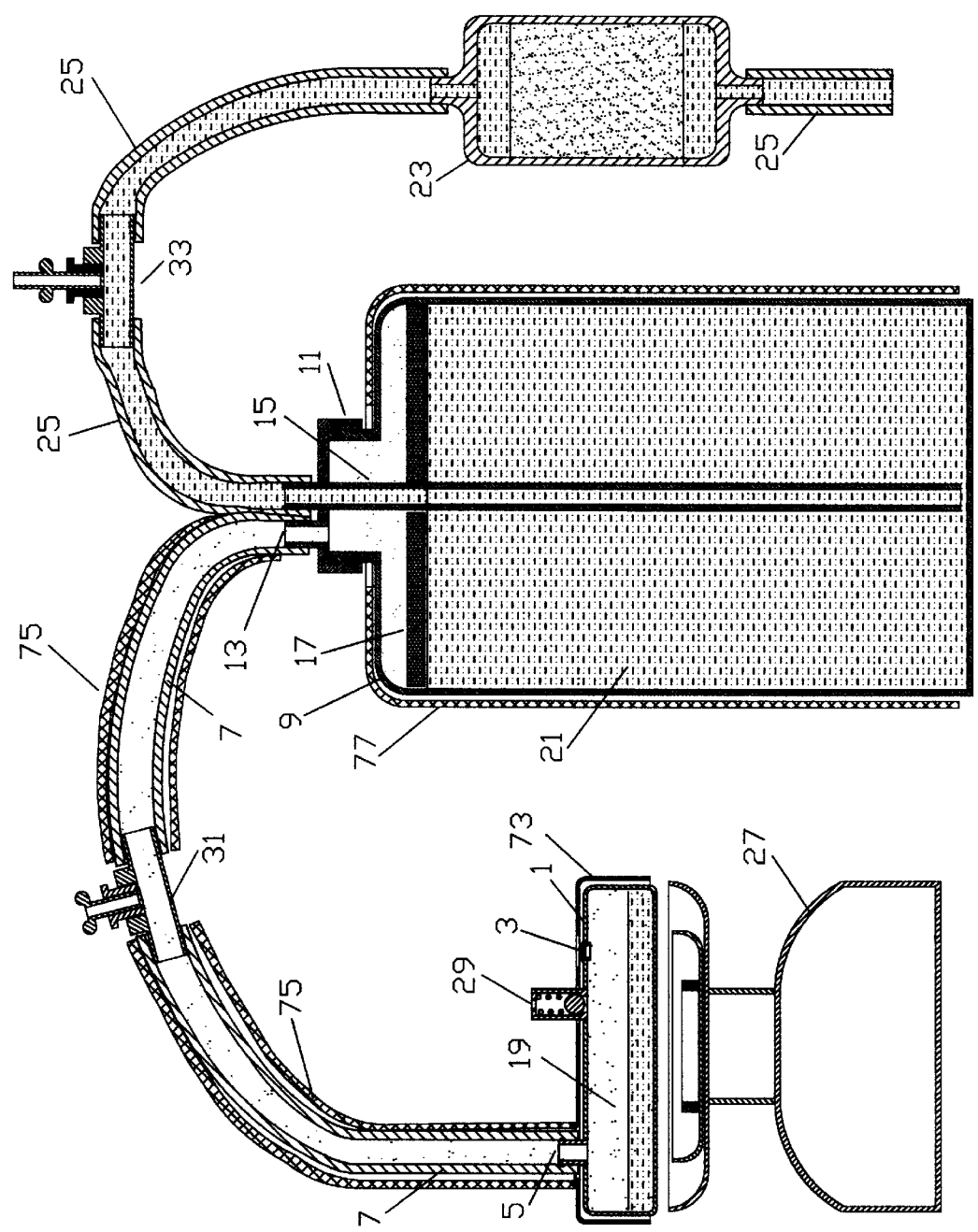
FIG. 23: This figure shows an embodiment similar to that shown in FIG. 4 with the addition of a boiler thermal insulation shield, a steam tube thermal insulation shield and a steam pressurized water container thermal insulation layer.

FIG. 23: This figure displays an embodiment similar to that of FIG. 4 with the addition of a boiler thermal insulation shield (73), steam tube thermal insulation (75) and steam pressurized water container thermal insulation (77). These thermally insulating devices increase the boiling efficiency and reduce water pumping time by reducing steam condensation and thereby maintaining higher pumping pressures. Note that these thermally insulating devices can be applied to all of the preceding and foregoing embodiments of the invention.

Figure 24:
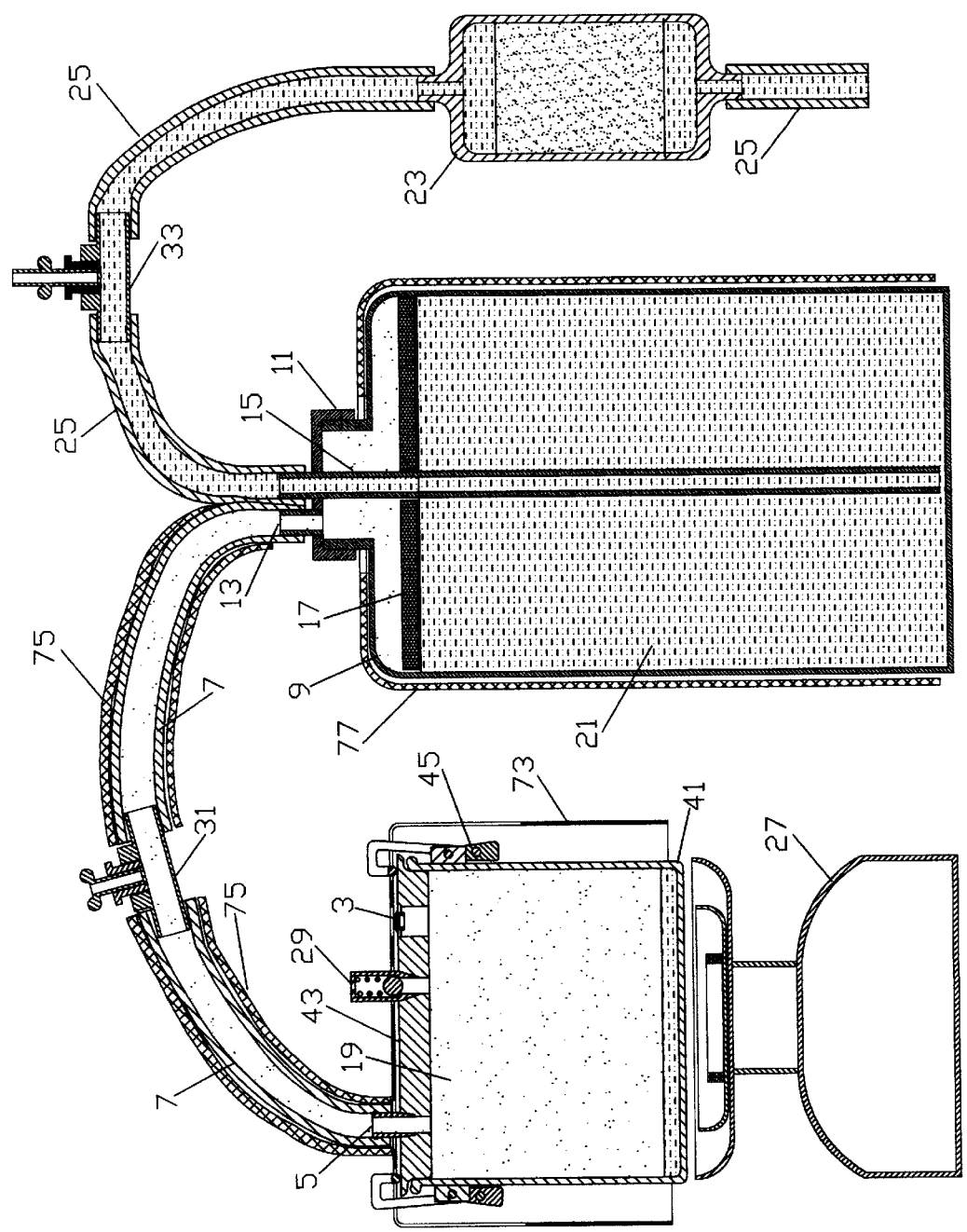
FIG. 24: This figure shows an embodiment similar to that shown in FIG. 8 with the addition of a boiler thermal insulation shield, a steam tube thermal insulation shield and a steam pressurized water container thermal insulation layer.

FIG. 24: This figure displays an embodiment similar to the one shown in FIG. 20, the only difference being that the boiler (1) has been replaced by a pressure cooker assembly.

Figure 25:
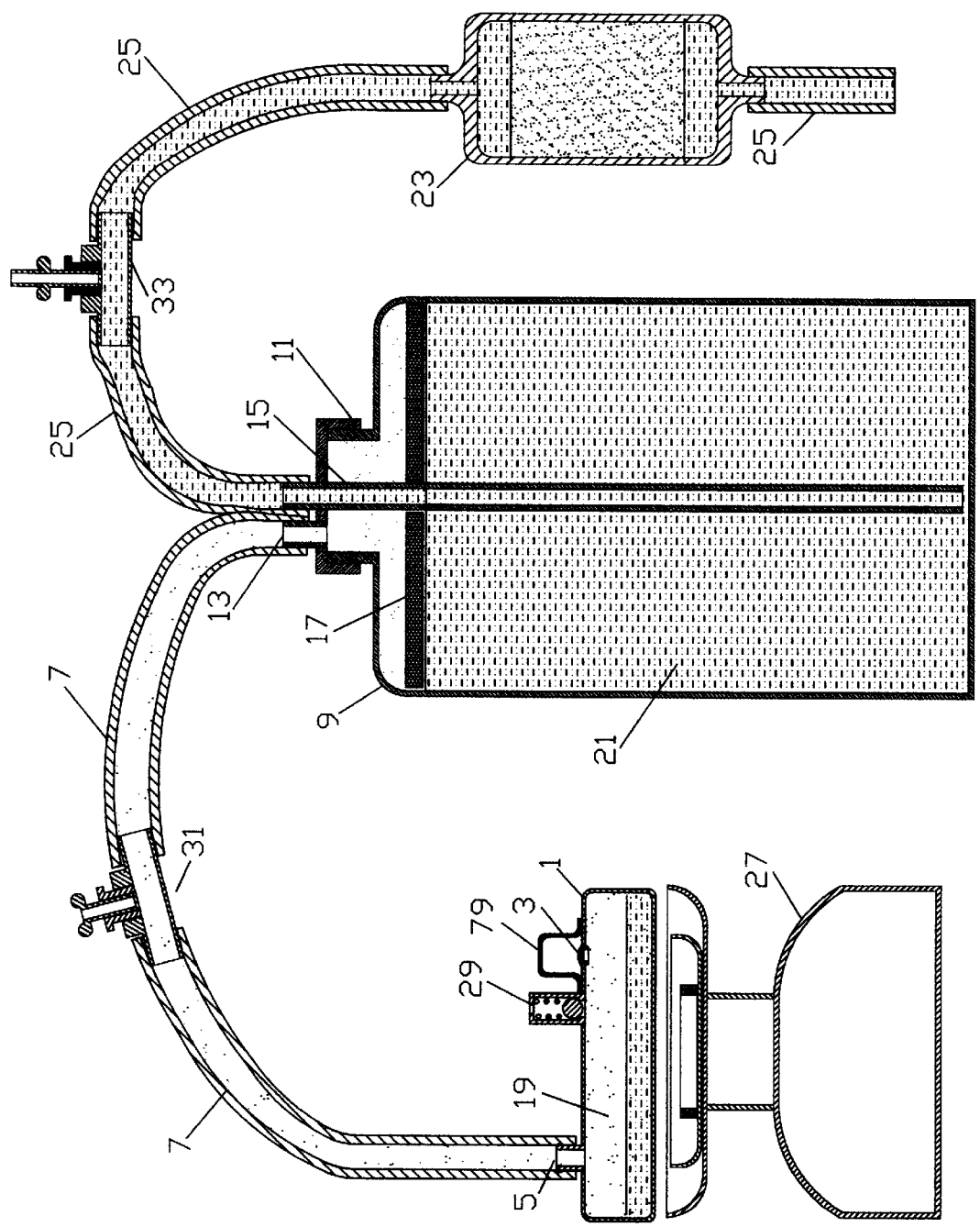
FIG. 25: This figure shows an embodiment similar to that shown in FIG. 4 with the addition of a pressure pop of safety cap deflector.

FIG. 25: This figure displays an embodiment similar to the one shown in FIG. 4, the only addition being a pressure pop off safety deflector (79) mounted to the top of the boiler (1).

Figure 26:
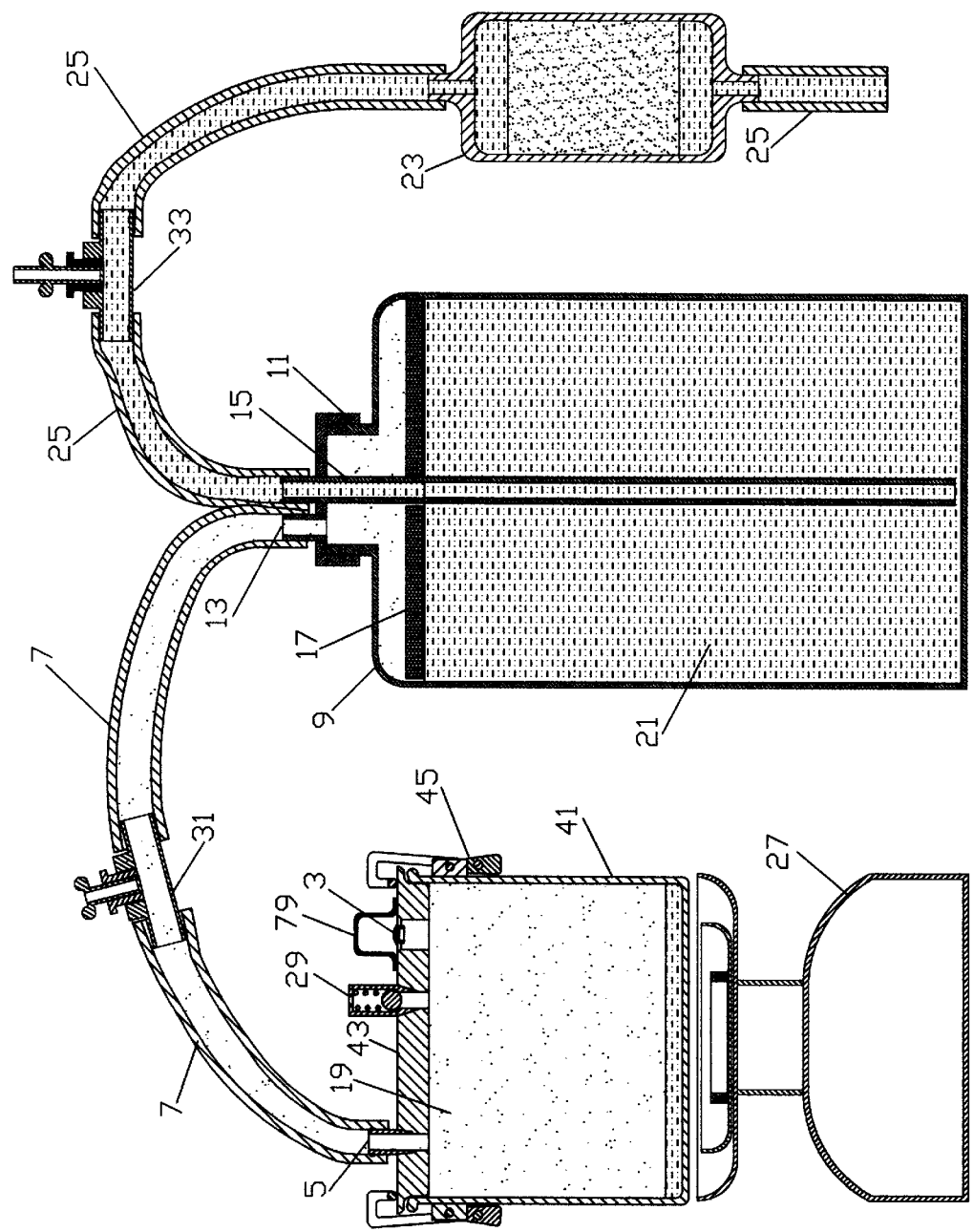
FIG. 26: This figure shows an embodiment similar to that shown in FIG. 8 with the addition of a pressure pop of safety cap deflector.

FIG. 26: This figure shows an embodiment similar to that of FIG. 25, the only difference being that the boiler (1) has been replaced by a pressure cooker assembly.

Figure 27:
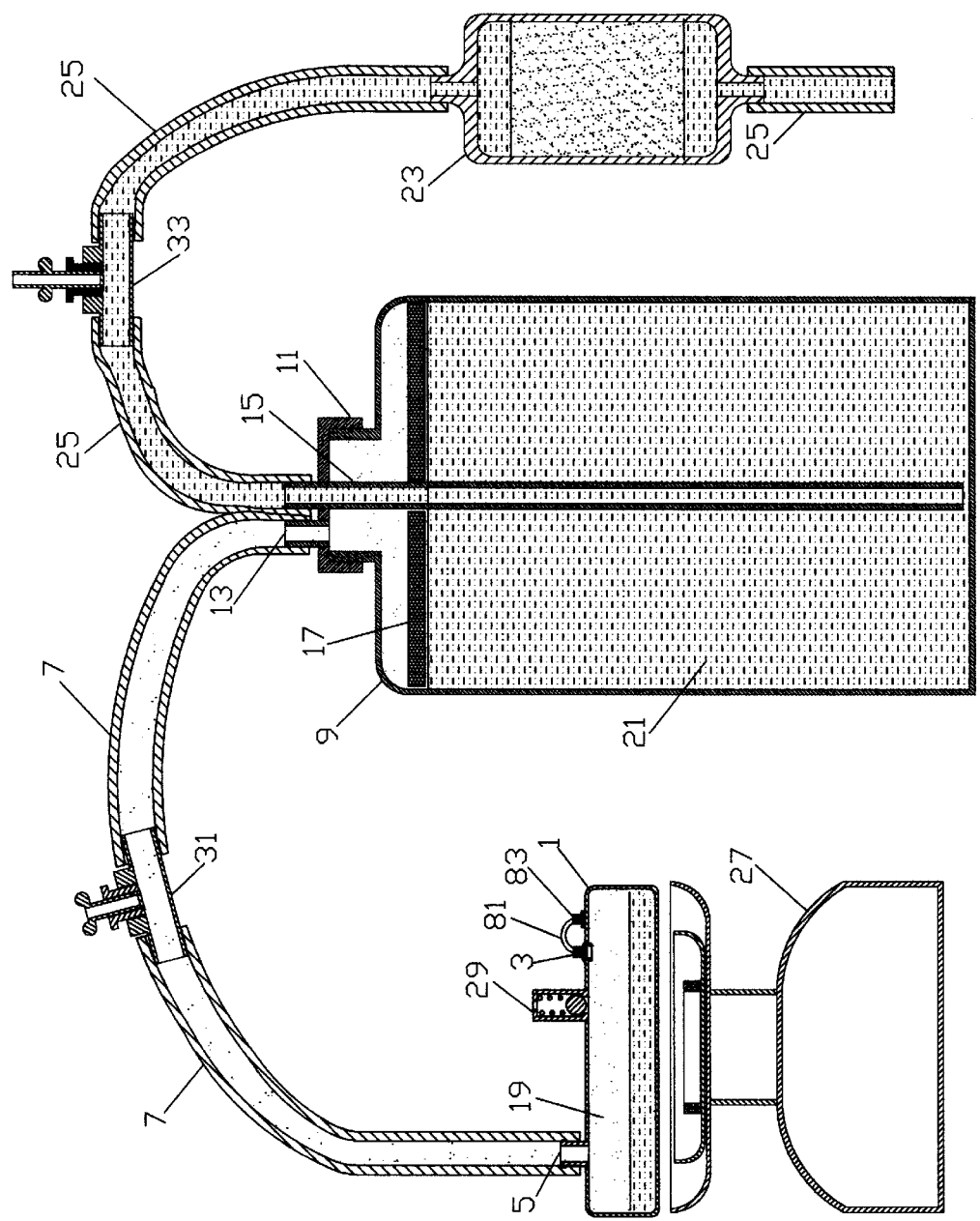
FIG. 27: This figure shows an embodiment similar to that shown in FIG. 4 with the addition of a tether which connects the pressure pop off safety cap to an anchor fastened to the boiler.

FIG. 27: This figure displays an embodiment similar to the one shown in FIG. 4, the only difference being that the pressure pop off safety cap (79) is tied to an anchor (83) mounted on the top of the boiler (1) via a tether (81).

Figure 28:
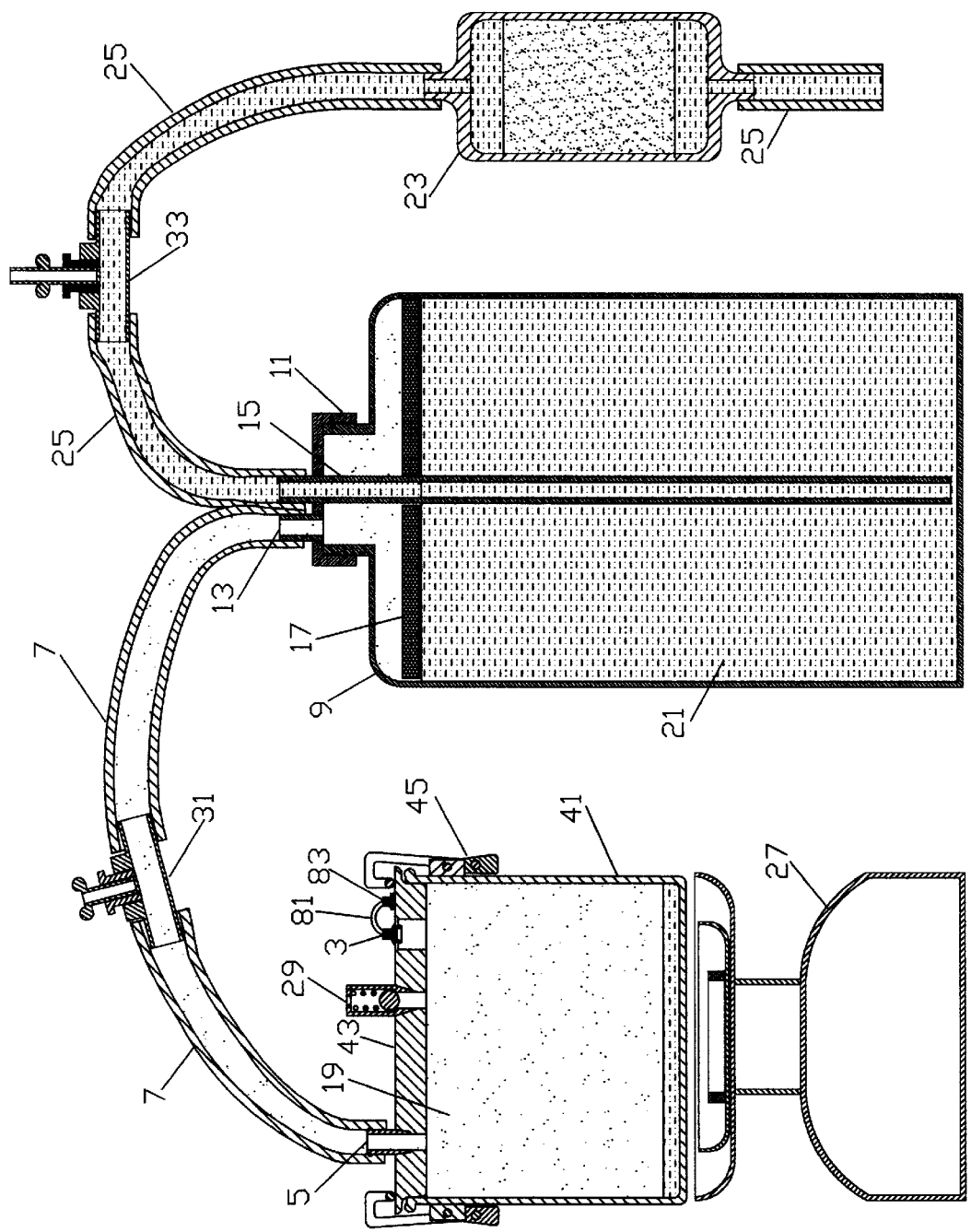
FIG. 28: This figure shows an embodiment similar to that shown in FIG. 8 with the addition of a tether which connects the pressure pop off safety cap to an anchor fastened to the pressure cooker top.

FIG. 28: This figure displays an embodiment similar to the one shown in FIG. 27, the only difference being that the boiler (1) has been replaced by a pressure cooker assembly.

Figure 29:
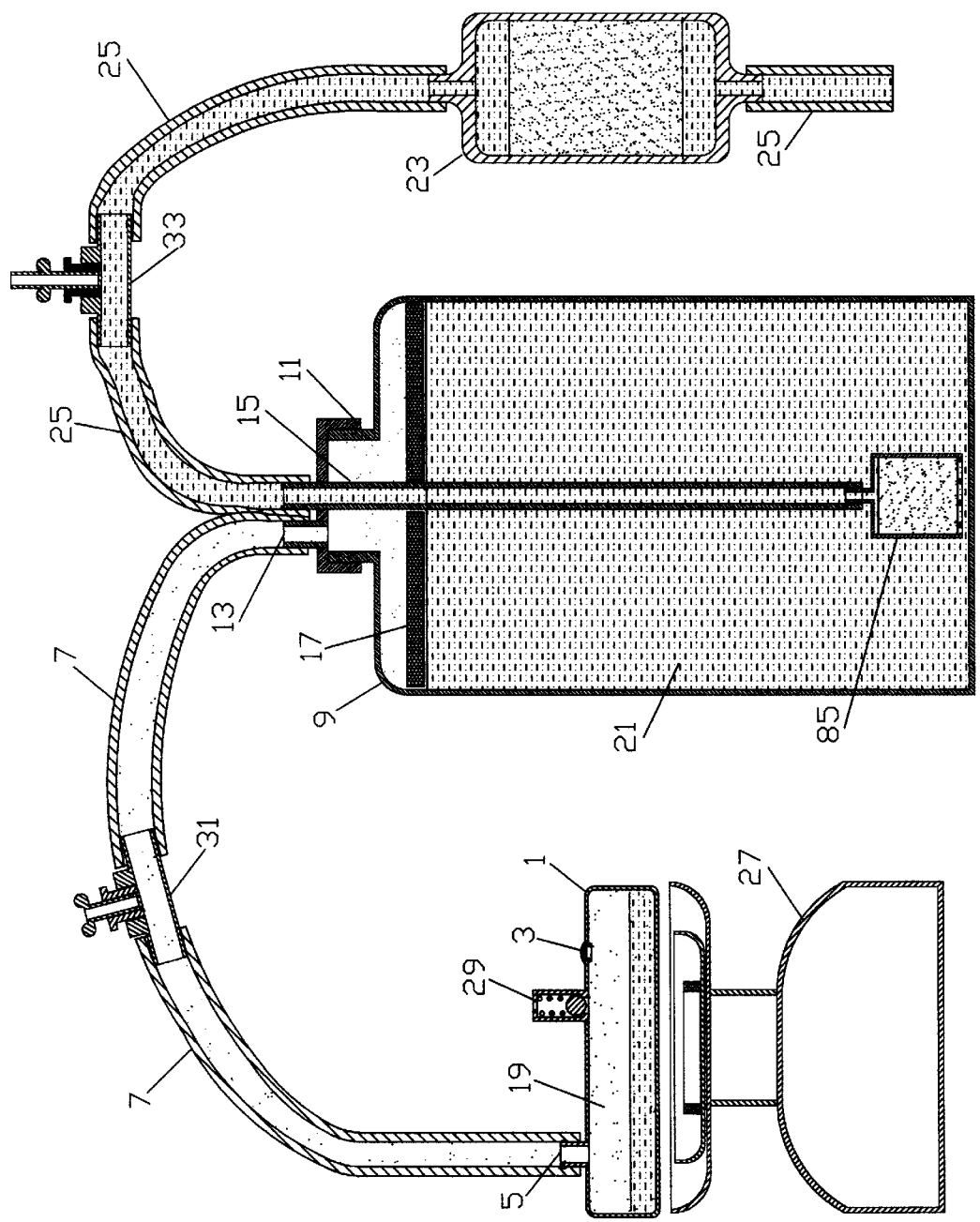
FIG. 29: This figure shows an embodiment similar to that shown in FIG. 4 with the addition of a prefilter attached to the bottom end of the water outlet tube.

FIG. 29: This figure displays an embodiment similar to that of FIG. 4, the only difference being that a prefilter (85) has been added and is mounted on the bottom end of the water outlet tube (15).

Figure 30:
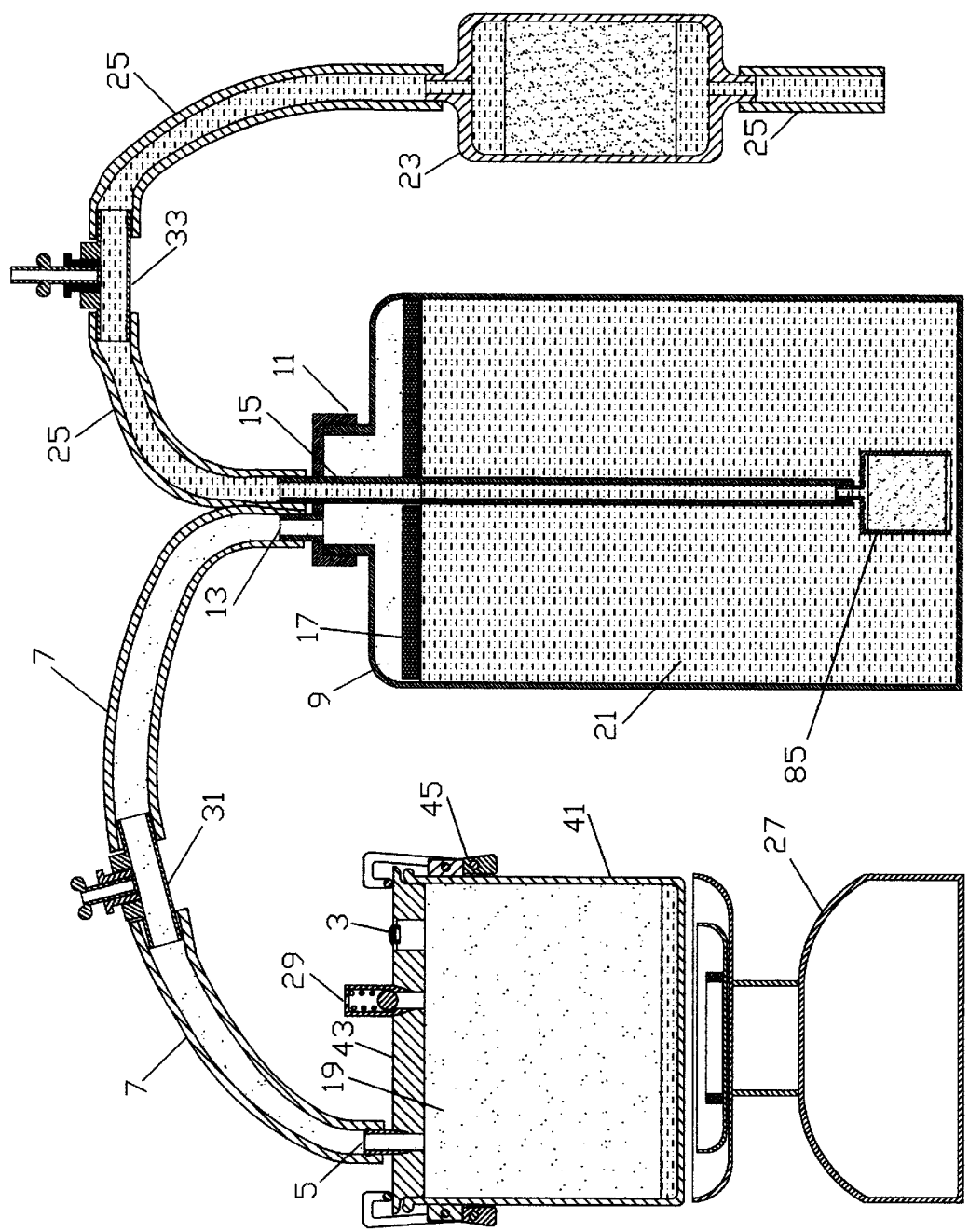
FIG. 30: This figure shows an embodiment similar to that shown in FIG. 8 with the addition of a prefilter attached to the bottom end of the water outlet tube.

FIG. 30: This figure shows an embodiment similar to that of FIG. 29, the only difference being that the boiler (1) has been replaced by a pressure cooker assembly.

Figure 31:
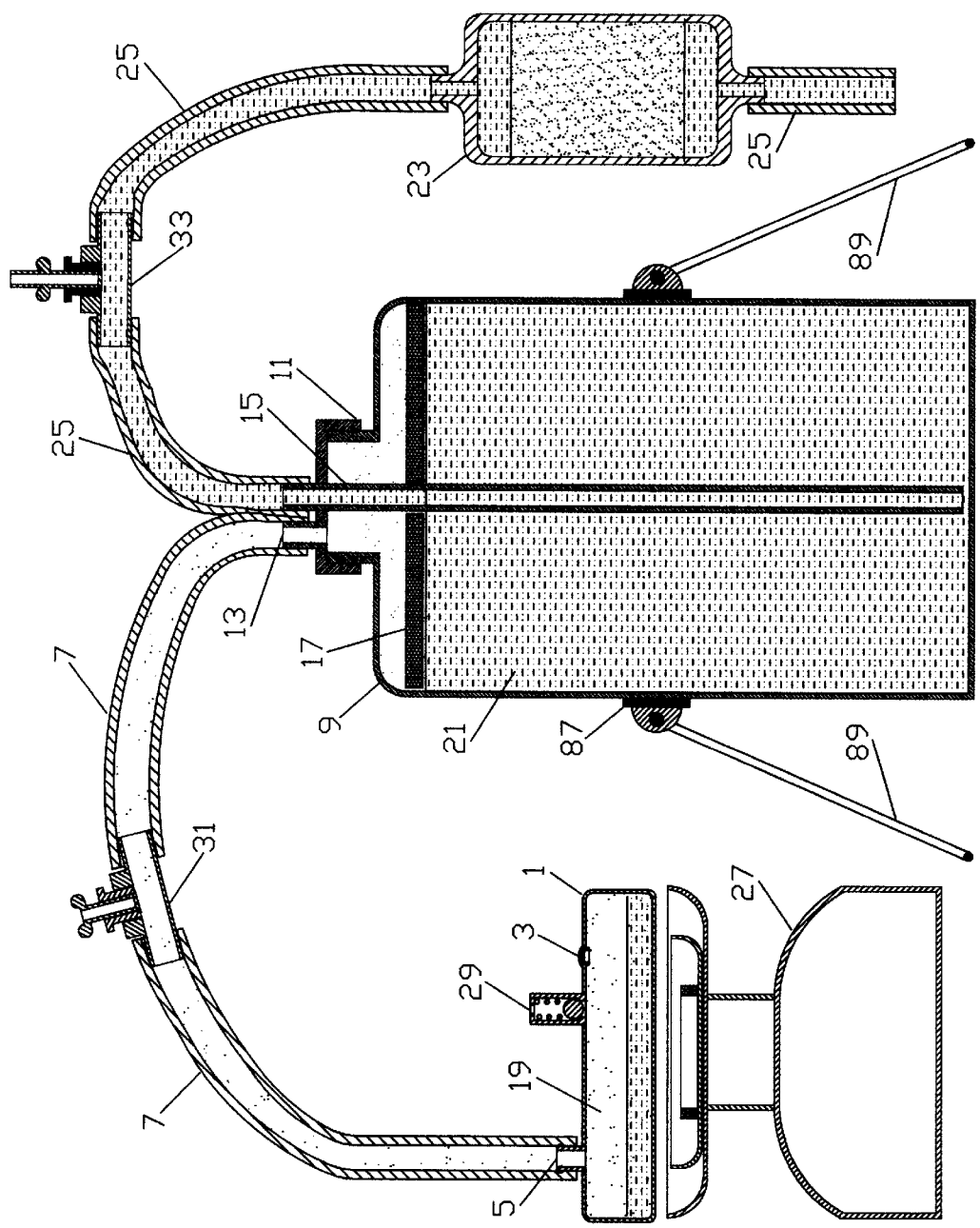
FIG. 31: This figure shows an embodiment similar to that shown in FIG. 4 with the addition of a bottle support stand.

FIG. 31: This figure displays an embodiment similar to that of FIG. 4, the only difference being that a water bottle stand ring (87), having water bottle stand legs (89) attached to it, has been joined to the water bottle (9).

Figure 32:
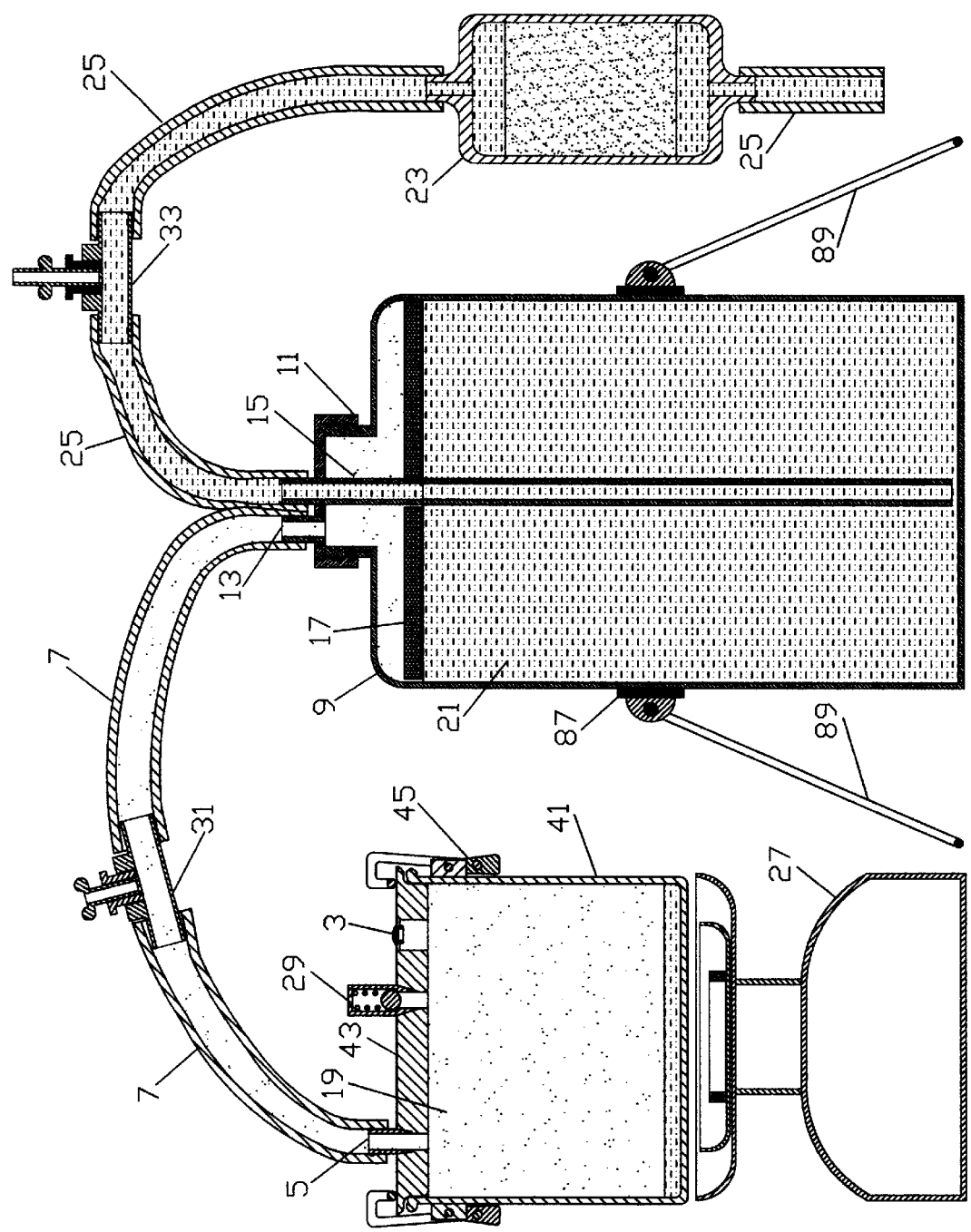
FIG. 32: This figure shows an embodiment similar to that shown in FIG. 8 with the addition of a bottle support stand.

FIG. 32: This figure shows an embodiment similar to that of FIG. 3 1, the only difference being that the boiler (1) has been replaced by a pressure cooker assembly.

Figure 33:
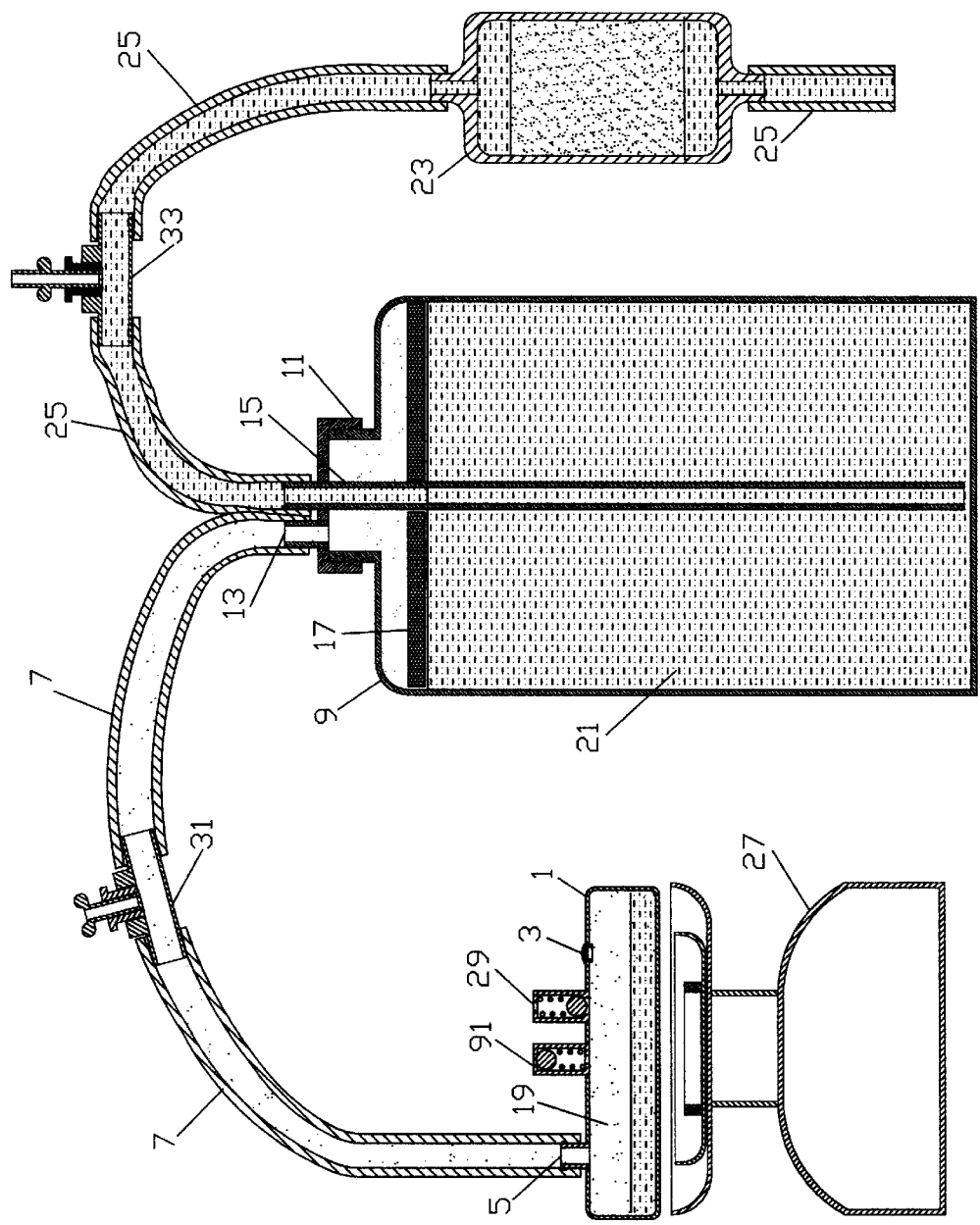
FIG. 33: This figure shows an embodiment similar to that shown in FIG. 4 with the addition of a vacuum relief cap.

FIG. 33: This figure shows an embodiment similar to that of FIG. 4, the only difference being that a vacuum relief valve (90) has been attached to the boiler (1).

Figure 34:
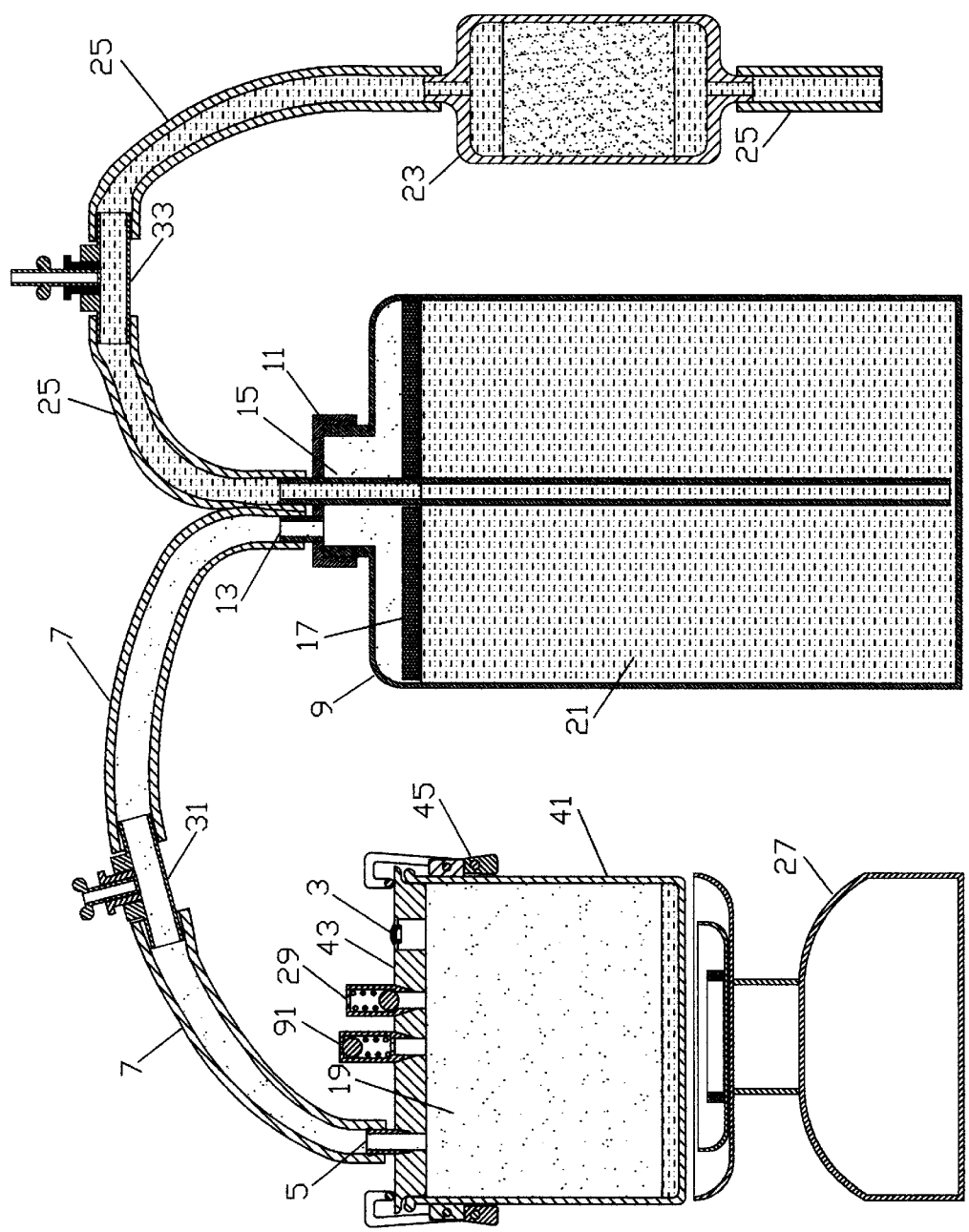
FIG. 34: This figure shows an embodiment similar to that shown in FIG. 8 with the addition of a vacuum relief valve.

FIG. 34: This figure shows an embodiment similar to that of FIG. 33, the only difference being that the boiler (1) has been replaced by a pressure cooker assembly.

Figure 35:
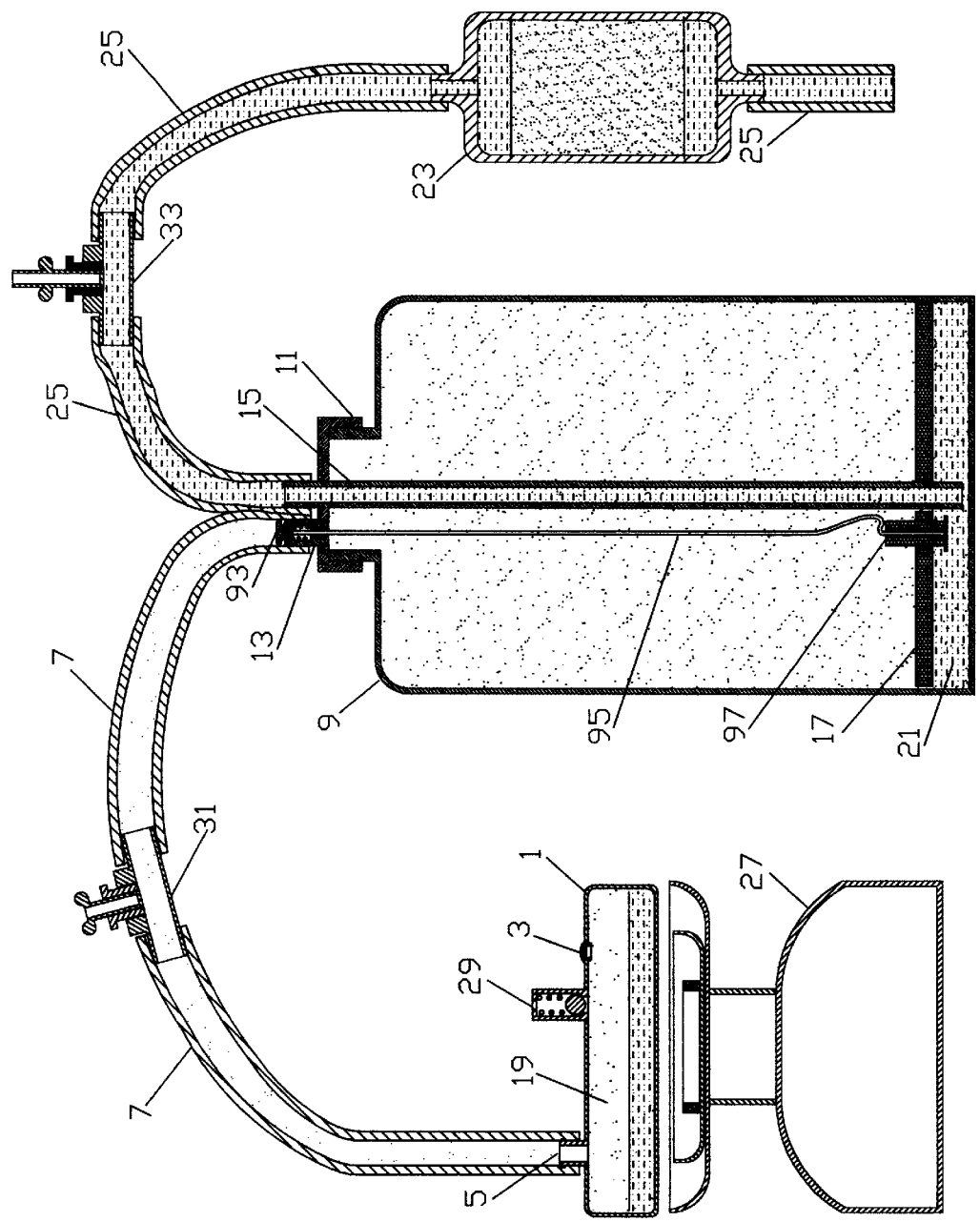
FIG. 35: This figure shows an embodiment similar to that shown in FIG. 4 with the addition of a water level actuated steam shut off valve.

FIG. 35: This figure shows an embodiment similar to that of FIG. 4, the only difference being that a water level actuated steam shut off valve (93) has been attached to the water bottle cap (11). The water level actuated steam shut off valve (93) is connected to the steam shut off valve float (97) via the steam shut off valve actuation cable (93).

Figure 36:
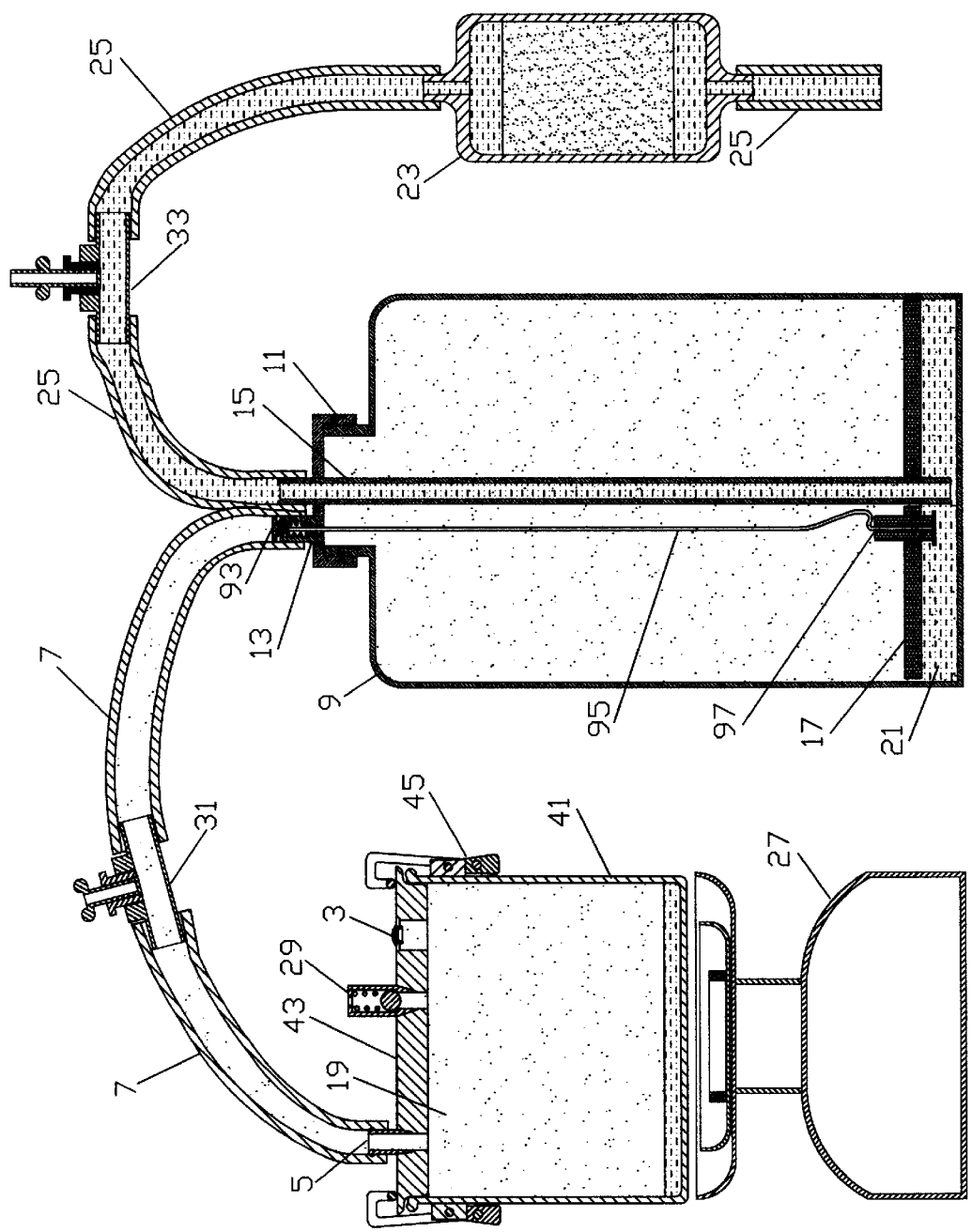
FIG. 36: This figure shows an embodiment similar to that shown in FIG. 8 with the addition of a water level actuated steam shut off valve.

FIG. 36: This figure shows an embodiment similar to that of FIG. 35, the only difference being that the boiler (1) has been replaced by a pressure cooker assembly.

OPERATION

FIG. 1: The basic operation of this system can be best described by referring to FIG. 1. The way this embodiment works is that the user starts by filling the water bottle (9) with water (21) that is to be pumped through the water filter (23). When the water bottle (9) is full, the user must then fasten the water bottle cap (11) to the water bottle (9). Then the user must fill the boiler (1) with enough water (21) to be able to pressurize and displace the unfiltered water in the water bottle (9) with steam (19). At this point the user must connect the boiler outlet tube (5) to the steam tube (7). Now the user must place the boiler (1) on the stove (27) and then turn on the stove (27) to commence the boiling of the water (21). Once the water (21) begins to boil steam (19) will flow out of the boiler outlet tube (5), through the steam tube (7) and enter into the water bottle (9) via the steam inlet tube (13) mounted to the water bottle cap (11). At this point the unfiltered water (21) will become pressurized by the steam (19), thus being forced out of the water bottle (9) via the water outlet tube (15), flow through the water tube (25) and then be forced through the water filter (23). After the water passes through the water filter (23) it will flow through a water tube (25) at which point the water has been filtered and is now safe for use as drinking or cooking water. In this embodiment there exists floating insulation (17) which floats on top of the unfiltered water (21) thereby thermally isolating the steam (19) from the water (21) thus preventing condensation and thereby increasing the pumping efficiency. In this system the pressure pop off safety cap (3) will pop off of the boiler (1) in a situation where the boiler pressure exceeds a desired design limit.

FIG. 2: This embodiment operates in the same fashion as that of FIG. 1 the only change being the addition of the pressure relief safety valve (29). This device will open up and drop the boiler pressure by letting steam (19) out whenever the boiler pressure exceeds design limits. Once the boiler pressure drops below design limits the valve will automatically close.

FIG. 3: This embodiment operates much like that of FIG. 2 the only addition being a pressure relief/boiler water filling valve (31). This device can be used as an auxiliary pressure relief valve and it can also be used to fill and refill the boiler (1) without having to disconnect the boiler (1) from the steam tube (7). With this embodiment the user could easily refill the boiler (1) between pumping cycles by pouring the desired amount of water into the boiler (1) via this valve.

FIG. 4: This embodiment is similar to that of FIG. 3 but with the addition of a water container filling valve (33), a water container filling tube (35), an auxiliary water storage container (37) and an auxiliary water storage container cap (39). These devices were added in order to make refilling of the water bottle (9) more convenient. The way that this system would work is as follows. The user would set up the system in the same manner as outlined in the operation description of FIG. 1 but in this case the user would also fill the auxiliary water storage container (37) with unfiltered water and then fasten it to the auxiliary water storage container cap (39). The auxiliary water storage container (37) would then be placed upon an object in such a manner that it is elevated above the water bottle (9), water container filling valve (33) and the water filter (23). The user would then start the stove (27) making sure that the water container filling valve (33) is closed. Once the water bottle (9) has been displaced by steam (19) the user would shut of the stove (27) and open the water container filling valve (33). At this point the steam (19) should condense thus creating a vacuum in the water bottle (9) and beginning to draw water (21) into the water bottle (9) from the auxiliary water storage container (37). The vacuum might normally only partially fill the water bottle (9) but because the auxiliary water storage container (37) is elevated above the water bottle (9) a gravity siphon effect will continue to fill the water bottle (9) until the user closes the water container filling valve (33). At this point the user can repeat the pumping cycle. Now that the water container filling tube (35) is filled with water (21) the user can take advantage of the gravity siphon effect to fill up the water bottle (9) even if no vacuum exists inside the water bottle (9). In order to refill the water bottle (9) the user would simply open the water container filling valve (33) until the water bottle (9) is fill and then close it.

Some of the ramifications of this embodiment are that the water container filling valve (33) could be incorporated into the auxiliary water storage container filling cap (39) and that the water contained in the auxiliary water storage container (37) could either be squeezed or poured into the water bottle (9) when refilling it.

FIGS. 5–8: These embodiments pump water similarly and correspond one to one with FIGS. 1–4 respectively. The only difference shown between these and the previous embodiments is that the boiler (1) of the previous embodiments has been replaced by a pressure cooker, thus adding functionality to the system. In order to use the pressure cooker the user would disconnect the steam tube (7) from the boiler outlet tube (5) and then place a cap on the boiler outlet tube (5) so as to seal it. At that point the user would remove the pressure cooker top (43) from the pressure cooker pot (41). Then the user would place food and water in the pressure cooker pot (41). At this point the user would fasten the pressure cooker top (43) to the pressure cooker pot (41) via the pressure cooker pot/top sealing device (45). Now the pressure cooker would be placed atop the stove (27) and the user could commence cooking.

FIG. 9,10: The operation of these embodiments is similar to that of FIG. 4 with the only difference being that the water outlet tube (15) is located near the bottom of the water bottle (9). The only difference between FIG. 9 and FIG. 10 is that a pressure cooker replaces the boiler (1) in FIG. 10.

Figure 13:
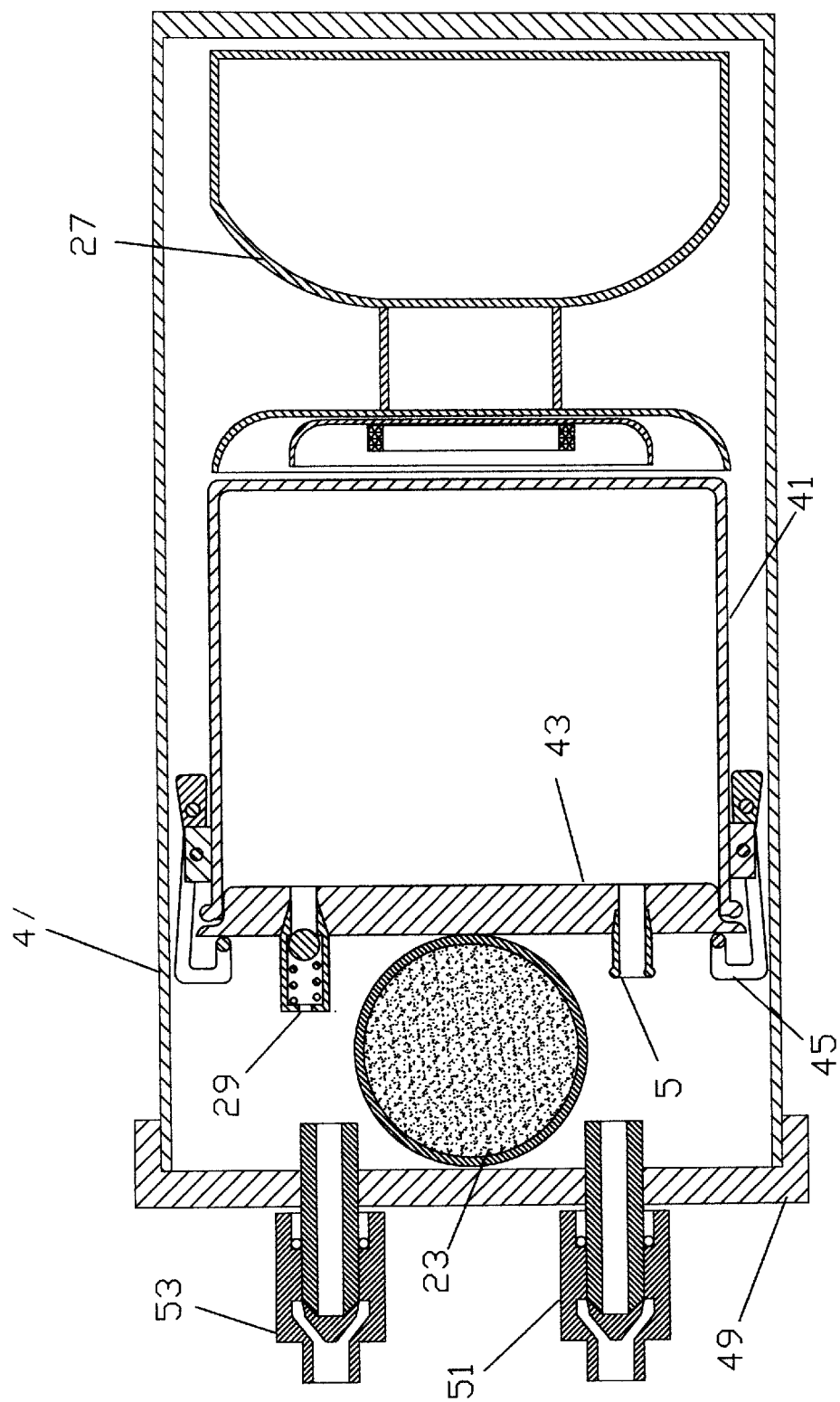
FIG. 13: This figure shows how the rigid water container of FIGS. 11 and 12 can be used to store a stove, a pressure cooker and a water filter.

FIG. 11–13: The operation of these embodiments is similar to that of FIG. 4 with the only difference being the replacement of the water bottle (9) with a rigid water container (47) having a water container steam inlet tube (51) and a water container water outlet tube (53) mounted to the water container top (49). The functionality added by the water container (47) is that it can be used as either an animal proof, food storage container or it can be used as a container for the stove (27), pressure cooker assembly and water filter (23) as shown in FIG. 13.

FIG. 14,15: The operation of these embodiments is similar to that of FIG. 4. The only physical difference from the embodiment of FIG. 4 is that the water bottle (9) has been replaced by a collapsible water container (55). This change makes the system more compact as the collapsible water container (55) can be folded to save room. The embodiment of FIG. 15 differs from that of FIG. 14 in that the boiler (1) has been replaced by a pressure cooker assembly. In these embodiments there exists floating insulation (17) which shall constantly cover the water (21) as the water level drops.

FIG. 16,17: The operation and physical configuration of these embodiments is similar to that of FIGS. 14 and 15 with the only difference being that the floating insulation (17) has effectively been replaced by an insulated steam pressure bladder (61). This device is a bladder which is made of thermally insulating material and is contained within the collapsible water container (55). As this bladder fills with steam (19) it will pressurize the water (21) surrounding it causing it to flow through the water filter (23). The only difference between FIGS. 16 and 17 is that in FIG. 17 the boiler (1) is replaced by a pressure cooker assembly.

FIG. 18,19: The operation and physical configuration of these embodiments is similar to that of FIGS. 14 and 15 with the only difference being that the floating insulation (17) has effectively been replaced by an insulated water container bladder (63). The insulated water container bladder (63) is located inside the collapsible water container (55) and is pressurized by the surrounding steam (19). The only difference between FIGS. 18 and 19 is that in FIG. 19 the boiler (1) is replaced by a pressure cooker assembly.

FIGS. 20–22: The operation and physical configuration of these embodiments is similar to that of FIGS. 14 and 15 with the only difference being that in these embodiments the collapsible water container (55) is fastened to a collapsible water container frame (65). This system allows the user to force the collapsible water container (55) open so as to make it easier to fill with water (21). In order to open up the collapsible water container (55) the user would simply open the collapsible water container frame (65), pivoting it about its hinge (67). The only difference between FIGS. 20 and 21 is that in FIG. 21 the boiler (1) is replaced by a pressure cooker assembly. This embodiment could use either floating insulation (17), an insulated steam pressure bladder (61) or an insulated water container bladder (63) to thermally isolate the steam (19) from the water (21).

FIGS. 23,24: These embodiments pump water similarly the embodiment of FIG. 4 with the only physical additions being a boiler thermal insulation shield (73), steam tube thermal insulation (75) and steam pressurized water container thermal insulation (77). These thermal insulating devices have been added to reduce the cooling condensation of the steam (19) thereby increasing the system efficiency. The only difference between FIGS. 23 and 24 is that in FIG. 24 the boiler (1) is replaced by a pressure cooker assembly.

FIGS. 25,26: These embodiments operate in a manner similar to the embodiment of FIG. 4, the only addition to this system is a pressure pop off safety cap deflector (79). This device functions by deflecting the pressure pop off safety cap (3) down and to the sides in the event that it is expelled by an overpressure condition. This device will also act to deflect the steam jet down and to the sides. This device was added to the system to increase its safety by preventing the pressure pop off safety cap (3) and steam jet from being shot straight up at the user. The embodiment of FIG. 26 differs slightly from that of FIG. 25 in that the boiler (1) is replaced by a pressure cooker assembly.

FIGS. 27,28: These embodiments function similarly to that of FIG. 4, the main difference being that the pressure pop off safety cap (3) has been tied to an anchor (83) on the boiler (1) via a tether (81). The purpose of this addition is to be able to keep the pressure pop off safety cap (3) from coming off and hitting the user in an overpressure condition. The embodiment of FIG. 28 differs from that of FIG. 27 in that the boiler (1) has been replaced by a pressure cooker assembly.

FIGS. 29,30: These embodiments function similarly to that of FIG. 4, the only difference being the addition of a prefilter (85). The prefilter (85) acts to remove larger particles and sediment that may exist in the water (21) to be filtered. This device prevents premature clogging of the water filter (23). The embodiment of FIG. 30 differs from that of FIG. 29 only in that the boiler (1) has been replaced by a pressure cooker assembly.

FIG. 31,32: These embodiments function similarly to that of FIG. 4, the only difference being that a method of standing the water bottle (9) up and increasing its wall rigidity has been added. This has been accomplished by joining the water bottle (9) outside diameter to the water bottle stand ring (87) inside diameter. Water bottle stand legs (89) are then attached to the water bottle stand ring (87), thus forming a stand for the water bottle (9). The embodiment of FIG. 32 differs from that of FIG. 31 only in that the boiler (1) has been replaced by a pressure cooker assembly.

FIG. 33,34: These embodiments function similarly to that of FIG. 4 the only difference being that a vacuum relief valve (90) has been added in order to prevent a high vacuum forming in the system when the stove (27) is turned off and the steam (19) condenses. The embodiment of FIG. 34 differs from that of FIG. 33 in that the boiler (1) has been replaced by a pressure cooker assembly.

FIG. 35,36: These embodiments function similarly to that of FIG. 4 the only difference being that a water level actuated steam shut off valve (93) has been added in order to prevent steam (19) from flowing through the water filter (23) in case the stove (27) is not turned off after the contaminated water (21) has been pumped and filtered. The way that the system works is that when the water level drops significantly the steam shut off valve float (97) will begin to hang on the steam shut off valve actuation cable (95) which will in turn pull down the water level actuated steam shut off valve (93) thus preventing steam (19) from flowing through the rest of the system. The embodiment of FIG. 36 differs from that of FIG. 35 in that the boiler (1) has been replaced by a pressure cooker assembly.

SUMMARY, RAMIFICATIONS AND SCOPE

The novel features of this invention consists of the basic design of this water filtration system and the fact that it possesses of all of the most desired qualities of an outdoor water filtration system including being portable and light weight, requiring no human effort to filter water, being capable of filtering large volumes of water in a short amount of time, being capable of filtering microorganisms, viruses, bacteria and chemicals and being a simple, low cost system.

This portable water filtration device differs significantly in function from the prior art portable water filters in that it is an automatic water filter requiring no pumping work input from the user. It also differs in function from prior art designs in that the compact boiler can be used as a pressure cooker. It differs physically from the prior art in that the more complicated pump mechanism associated with prior art designs is replaced by a compact boiler and water container. Yet another advantage of this invention is that the water container, which can be designed to house the camping stove and boiler, can also be used as an air tight food storage container. The ramification of this is that a camper could avoid the hassle of having to hang food out of reach of animals as they can not smell food if it is stored in an air tight container.

The main advantage that this invention offers is that it relieves the user from having to spend the time and physical effort that was required when filtering water with the previous art designs. This invention is also inherently more reliable and less expensive to manufacture because it has no moving parts and is composed of fewer parts. To add to this list of benefits the pressure cooking capability of this invention is of great use to campers and backpackers because the higher efficiency of pressure cooking allows the user to carry less fuel and cook meals in less time. The air tight food storage capability of the water container saves the back packer or camper even more time as they will not have to spend their time finding and hanging food from trees.

Although the description above contains specificity's, these should not be construed as limiting the scope of the invention, but merely as providing illustrations of some of the presently preferred embodiments of this invention. The stove, boiler, water container, insulation, tubing and/or filter can vary widely in design so as to achieve different design goals. The size and shapes of all of these devices can be varied without harming the novelty of the invention. These devices may also be combined in different combinations in order to achieve different performance goals for the invention described herein.

A ramification for this invention would be to add a device that would be used to hold the boiler or pressure cooker in place on the stove.

Yet another ramification of the invention would be that the stove and boiler could be built as a composite, one piece unit.

Another ramification would be that the boiler would be composed of several tubes thereby increasing the heated area of the water in the boiler.

Thus the scope of the invention should be determined by the appended claims and their legal equivalents, rather than by the examples given.

What is claimed is:

1. A steam pressurized water filtering system comprising,
   a boiler in which steam is produced connected to,
   a container separable from said boiler housing water to be pressurized by said steam, possessing insulating means for minimizing commingling and heat transfer between said steam and said water, and
   a filter through which said water is directed by said pressuring.

2. The system in accordance with claim 1 further comprising a pressure pop off cap mounted to said boiler.

3. The system in accordance with claim 2 wherein said insulating means comprises insulation to thermally isolate said water from said steam.

4. The system in accordance with claim 3 further comprising a pressure relief safety valve mounted to said boiler.

5. The accordance with claim 4 wherein said pressure relief valve is configured to used as an orifice by which said boiler can be refilled by using either calibrated or non-calibrated volume metering methods.

6. The system in accordance with claim 5 further comprising a valve located to control refilling of said container.

7. The system in accordance with claim 6 further comprising an auxiliary container operable to elbow refilling of said container.

8. The system in accordance with claim 7 wherein said separable container is rigid.

9. The system in accordance with claim 7 wherein said separable container is large enough to house said boiler, said filter and a heat source device, said container also is capable of functioning as an airtight food container.

10. The system in accordance with claim 7 wherein said separable container is comprised of a collapsible container, further comprising a cap mounted to its first end having a steam inlet tube mounted to it and wherein a water exit tube is mounted to its second end, further comprising a stand which holds said collapsible container up so as to allow gravity to force said water to the second end of said collapsible container.

11. The system in accordance with claim 10 wherein said insulation comprises a bladder contained in said collapsible container in which said steam collects thereby pressurizing said water contained in said collapsible container.

12. The system in accordance with claim 10 wherein said insulation comprises a bladder contained in said collapsible container in which said water is contained, said water being pressurized by said steam which collects in said collapsible container.

13. The system in accordance with claim 7 wherein said auxiliary container comprises pliable bag fastened at several sides to an expandable metal frame.

14. The system in accordance with claim 7 wherein said boiler, said container and said auxiliary container are thermally insulated.

15. The system in accordance with claim 7 wherein a pressure pop off safety cap deflector is mounted to said boiler.

16. The system in accordance with claim 7 wherein said pressure pop off safety cap is tied to an anchor on said boiler via a tether.

17. The system in accordance with claim 7 wherein a prefilter is attached to the end of a water outlet tube mounted to the cap of said auxiliary container.

18. The system in accordance with claim 7 further comprising a stand configured to securely hold said separable container and to add rigidity to said separable container.

19. The system in accordance with claim 7 further comprising a vacuum relief valve located to reduce vacuum formation in the system.

20. The system in accordance with claim 7 further comprising a valve which will shut off steam flow into said separable container and said filter once said water has been filtered.

21. A steam pressurized water filtering system comprising:
    a pressure cooker in which steam is produced,
    a container, separable from said pressure cooker, housing water to be pressurized by said steam, and possessing insulating means for minimizing commingling and heat transfer between said steam and said water, and a filter through which said water is directed by said pressurizing.

22. The system in accordance with claim 21 further comprising a pressure pop off cap mounted to said pressure cooker.

23. The system in accordance with claim 22 wherein said insulating means comprises insulation which thermally isolates said water from said steam.

24. The system in accordance with claim 23 further comprising a pressure relief safety valve mounted to said pressure cooker.

25. The system in accordance with claim 24 wherein said pressure relief valve is configured to also be used as an orifice by which said pressure cooker can be refilled by using either calibrated or non-calibrated volume metering methods.

26. The system in accordance with claim 25 further comprising a valve located to control refitting of said container.

27. The system in accordance with claim 26 further comprising an auxiliary container operable to allow refilling of said container.

28. The system in accordance with claim 27 wherein said separable container is rigid.

29. The system in accordance with claim 27 wherein said separable container is large enough to house said pressure cooker, said filter and a heat source device, and also is capable of functioning as an airtight food container.

30. The system in accordance with claim 27 wherein said separable container is comprised of a collapsible container, further comprising a cap mounted to its first end having a steam inlet tube mounted to it and wherein a water exit tube is mounted to its second end, further comprising a stand which holds said collapsible container up so as to allow gravity to force said water to the second end of said collapsible container.

31. The system in accordance with claim 30 wherein said insulation is comprised of a bladder contained in said collapsible container in which said steam collects, thereby pressurizing said water contained in said collapsible container.

32. The system in accordance with claim 30 wherein said insulation further comprises a bladder contained in said collapsible container in which said water is contained, said water being pressurized by said steam which collects in said collapsible container.

33. The system in accordance with claim 27 wherein said auxiliary container comprises a pliable bag fastened at several sides to an expandable metal frame.

34. The system in accordance with claim 27 wherein said pressure cooker, said separable container and said auxiliary container are thermally insulated.

35. The system in accordance with claim 27 wherein a pressure pop off safety cap deflector is mounted to said pressure cooker.

36. The system in accordance with claim 27 wherein said pressure pop off safety cap is tied to an anchor on said pressure cooker via a tether.

37. The system in accordance with claim 27 wherein a prefilter is attached to the end of a water outlet tube mounted to the cap of said auxiliary container.

38. The system in accordance with claim 27 further comprising a stand configured to securely hold said separable container and to add rigidity to said separable container.

39. The system in accordance with claim 27 further comprising a vacuum relief valve located to reduce vacuum formation in the system.

40. The system in accordance with claim 27 further comprising a valve which will shut off steam flow into said separable container and said filter once said water has been filtered.

* * * * *